(12) United States Patent
Juzga et al.

(10) Patent No.: US 12,711,361 B2
(45) Date of Patent: Aug. 18, 2026

(54) ACTIVATION ACCELERATOR FOR NEURAL NETWORK ACCELERATOR

(71) Applicant: Imagination Technologies Limited, Kings Langley (GB)

(72) Inventors: Fernando Adolfo Escobar Juzga, Hertfordshire (GB); Alan Edward Vines, Hertfordshire (GB)

(73) Assignee: Imagination Technologies Limited, Kings Langley (GB)

( * ) Notice: Subject to any disclaimer, the term of this patent is extended or adjusted under 35 U.S.C. 154(b) by 55 days.

(21) Appl. No.: 18/758,244

(22) Filed: Jun. 28, 2024

(65) Prior Publication Data

US 2025/0053595 A1 Feb. 13, 2025

(30) Foreign Application Priority Data

Jun. 30, 2023 (GB) ..................................... 2310098
Jun. 30, 2023 (GB) ..................................... 2310100
(Continued)

(51) Int. Cl.
*G06N 3/048* (2023.01)
*G06F 1/03* (2006.01)
(Continued)

(52) U.S. Cl.
CPC ............... *G06N 3/048* (2023.01); *G06F 1/03* (2013.01); *G06F 9/5027* (2013.01);
(Continued)

(58) Field of Classification Search
CPC ... G06N 3/048; G06F 16/2282; G06F 16/258; G06F 16/9017; G06F 1/03; G06F 9/5027
(Continued)

(56) References Cited

U.S. PATENT DOCUMENTS

2017/0169132 A1 6/2017 Hossack et al.
2019/0147323 A1 5/2019 Li et al.
(Continued)

FOREIGN PATENT DOCUMENTS

CN 108920748 A 11/2018
CN 115906965 A * 4/2023 ............. G06N 3/063
(Continued)

OTHER PUBLICATIONS

Nottenbeck et al; "Implementation of high-performance, sub-microsecond deep neural networks in FPGA's for trigger applications"; arXiv:1903.10201v2 [physics.ins-det] Jun. 28, 2019; Mar. 25, 2019; 26 pages.
Prebeck et al; "A Smart HW-Accelerator for Non-uniform Linear Interpolation of MIL-Activation Functions"; Aug. 14, 2022; pp. 267-282.
(Continued)

*Primary Examiner* — Giovanna B Colan
(74) *Attorney, Agent, or Firm* — Potomac Law Group, PLLC; Vincent M DeLuca

(57) ABSTRACT

An activation accelerator for use in a neural network accelerator includes a look-up table and activation pipelines. The look-up table stores values representing a non-linear activation function. Each activation pipeline comprises a range conversion unit which receives an input value and generates a converted value from the input value, an index generation unit which receives information identifying a first subset of bits of the converted value and a second subset of bits of the converted value, generates an index from the first subset of bits of the converted value, and generates an interpolation value from the second subset of bits of the converted value, a look-up table interface unit which retrieves multiple values from the look-up table based on the index, and an interpolation unit which generates an estimated result of the non-linear activation function for the input value by interpolating between the multiple values retrieved from the look-up table based on the interpolation value.

20 Claims, 23 Drawing Sheets

(30) Foreign Application Priority Data

Jun. 30, 2023 (GB) ...................................... 2310101
Jun. 30, 2023 (GB) ...................................... 2310102

(51) Int. Cl.
*G06F 9/50* (2006.01)
*G06F 16/22* (2019.01)
*G06F 16/25* (2019.01)
*G06F 16/901* (2019.01)

(52) U.S. Cl.
CPC ........ *G06F 16/2282* (2019.01); *G06F 16/258* (2019.01); *G06F 16/9017* (2019.01)

(58) Field of Classification Search
USPC .......................................................... 707/741
See application file for complete search history.

(56) References Cited

U.S. PATENT DOCUMENTS

2019/0384575 A1 12/2019 Hickmann et al.
2021/0117155 A1 4/2021 Vasyltsov et al.

FOREIGN PATENT DOCUMENTS

CN 116384443 A * 7/2023 ......... G06F 15/7889
CN 116384444 A * 7/2023 ......... G06F 14/7889
CN 117332196 A * 1/2024 ............. G06F 17/16
EP 3480742 A1 5/2019

OTHER PUBLICATIONS

Wu; "Simplifying Neural Networks via Look Up Tables and Product of Sums Matrix Factorizations"; 2019 IEEE International Symposium on Circuits and Systems; Oct. 12, 2020; 11 pages.

* cited by examiner

ACTIVATION ACCELERATOR FOR NEURAL NETWORK ACCELERATOR

CROSS-REFERENCE TO RELATED APPLICATIONS AND CLAIM OF PRIORITY

This application claims foreign priority under 35 U.S.C. 119 from United Kingdom patent application Nos. GB2310100.9, GB2310098.5, GB2310101.7, and GB 2310102.5, all filed on 30 Jun. 2023, the contents of which are incorporated by reference herein in their entirety.

TECHNICAL FIELD

This application is directed to hardware accelerators, which may also be referred to as activation accelerators, that accelerate non-linear activation operations, and specifically activation accelerators for use in a neural network accelerator.

BACKGROUND

An artificial neural network, which will be referred to herein as a neural network, comprises one or more interconnected layers that can be used for machine learning applications. In particular, a neural network can be used in signal processing applications, including, but not limited to, image processing and computer vision applications. FIG. 1 illustrates an example neural network 100 that comprises a plurality of layers 102, 104, 106. Each layer 102, 104, 106 receives input data, and processes the input data in accordance with the layer to produce output data. The output data is either provided to another layer as the input data or is output as the final output data of the neural network. For example, in the neural network 100 of FIG. 1, the first layer 102 receives the original input data 108 to the neural network 100 and processes the input data in accordance with the first layer 102 to produce output data 110. The output data 110 of the first layer 102 becomes the input data to the second layer 104, and the second layer 104 processes the input data 110 in accordance with the second layer 104 to produce output data 112. The output data 112 of the second layer 104 becomes the input data to the third layer 106, and the third layer 106 processes the input data 112 in accordance with the third layer 106 to produce output data 114. The output data 114 of the third layer 106 is then output as the final output data of the neural network. Where the neural network is used for classification, the final output data may be a vector of length A, wherein A is the number of classes and each value in the vector represents the probability of a certain class.

The data input to and output from a layer of a neural network can be described as a tensor. As is known to those of skill in the art, a tensor is a generalization of vectors and matrices and can be considered as an n-dimensional array. A vector is a one-dimensional tensor, and a matrix is a two-dimensional tensor. The tensors in a neural network are often, but are not necessarily, four-dimensional. Reference is made to FIG. 2 which illustrates an example four-dimensional (4D) tensor 200 in which one dimension (e.g. corresponding to the batch size) has been suppressed for visualisation purposes. The 4D tensor 200 may be described as comprising one or more 3D tensors, wherein each 3D tensor comprises C planes of data, where each plane has a dimension W×H. Each plane may be referred to as a channel of the tensor. The number of 3D tensors may be referred to as the batch size. Each 3D tensor may be, for example, an image. An element of a tensor may be referred to as a tensel, akin to how an element of a picture is referred to as a pixel.

The processing that is performed on the input tensor to a layer depends on the type of layer. For example, each layer of a neural network may be one of a plurality of different types. Example neural network layer types include, but are not limited to, a convolution layer, an activation layer, a normalisation layer, a pooling layer, a fully connected layer, and a batch normalisation layer. It will be evident to a person of skill in the art that these are example neural network layer types and that this is not an exhaustive list and there may be other neural network layer types.

A convolution layer convolves the input tensor with weights associated with the layer. Specifically, each convolution layer is associated with a plurality of weights $k_1 \ldots k_g$, which may also be referred to as filter weights or coefficients. The weights are grouped to form one or more filters or kernels, and each filter may be associated with an offset bias bias. Each filter may have a dimension $K_W \times K_H \times C_{in}$ (i.e., each filter may comprise a set of $K_W \times K_H \times C_{in}$ weights k), where $C_{in}$ is the number of channels in the input tensor. Each filter may be applied to the input tensor according to a convolution operation across steps $s_W$ and $s_H$ in the W and H directions. The step sizes $s_W$ and $s_H$ may be referred to as the strides of the convolution. The number and dimensions of filters and/or the number of weights per filter may vary between convolution layers. A convolutional neural network (CNN), which is a specific type of neural network that is effective for image recognition and classification, generally comprises a plurality of convolution layers.

An activation layer, which often, but not necessarily, follows a convolution layer, applies one or more activation functions to the input tensor. An activation function receives an input tensor and performs a certain non-linear mathematical operation on each value or element in the input tensor. In other words, the activation function operates on each value or element in the input tensor separately. In some examples, an activation layer may act as rectified linear unit (ReLU) by implementing an ReLU function or a leaky rectified linear unit (LReLU) by implementing a LReLU function.

A normalisation layer is configured to perform a normalising function, such as a Local Response Normalisation (LRN) function on the input tensor.

A pooling layer performs a pooling function, such as a max, min or average function, to summarise subsets of the input tensor. The purpose of a pooling layer is thus to reduce the spatial size of the representation to reduce the number of parameters and computation in the network, and hence to also control overfitting.

A fully connected layer, which often, but not necessarily, follows a plurality of convolution and pooling layers, takes a two-dimensional tensor (e.g. a tensor with a batch size and a channel dimension) of input data values and outputs a two-dimensional tensor (e.g. a tensor with a batch size dimension and a channel dimension). Where the DNN is used for classification, the output may have A channels where A is the number of classes, and each value in the tensor may represent the probability of a certain class. The output tensor is generated through a matrix multiplication of a set of weights, optionally followed by a bias offset. A fully connected layer thus receives a set of weights and may receive a bias.

A batch normalisation (often referred to as “batch norm”) layer, which often, but not necessarily, follows a convolution layer, applies a per channel affine transformation to an input tensor. Batch normalisation layers may be added to a neural network to make training of the neural network faster and more stable by normalisation of a subsequent layer's inputs by re-centring and re-scaling.

Neural networks are often expensive to implement in terms of computation, bandwidth and power. Accordingly, neural network accelerators (NNAs) have been developed that allow neural networks to be implemented in an efficient manner (e.g., in a manner that requires less silicon area or less processing power).

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Described herein are activation accelerators for use in a neural network accelerator. The activation accelerators comprise a look-up table and one or more activation pipelines. The look-up table is configured to store a plurality of values representing a non-linear activation function. Each activation pipeline comprises a range conversion unit, an index generation unit, a look-up table interface unit and an interpolation unit. The range conversion unit is configured to receive an input value and generate a converted value from the input value. The index generation unit is configured to receive information identifying a first subset of bits of the converted value and a second subset of bits of the converted value, generate an index from the first subset of bits of the converted value, and generate an interpolation value from the second subset of bits of the converted value. The look-up table interface unit is configured to retrieve multiple values from the look-up table based on the index. The interpolation unit is configured to generate an estimated result of the non-linear activation function for the input value by interpolating between the multiple values retrieved from the look-up table based on the interpolation value.

A first aspect provides an activation accelerator for use in a neural network accelerator, the activation accelerator comprising: a look-up table configured to store a plurality of values representing a non-linear activation function; and one or more activation pipelines, each activation pipeline comprising: a range conversion unit configured to receive an input value and generate a converted value from the input value; an index generation unit configured to receive information identifying a first subset of bits of the converted value and a second subset of bits of the converted value, generate an index from the first subset of bits of the converted value, and generate an interpolation value from the second subset of bits of the converted value; a look-up table interface unit configured to retrieve multiple values from the look-up table based on the index; and an interpolation unit configured to generate an estimated result of the non-linear activation function for the input value by interpolating between the multiple values retrieved from the look-up table based on the interpolation value.

A second aspect provides a method of applying a non-linear activation function to an input value using an activation accelerator, the method comprising: generating, at the activation accelerator, a converted value from an input value; receiving, at the activation accelerator, information identifying a first subset of bits of the converted value and a second subset of bits of the converted value; generating, at the activation accelerator, an index from the first subset of bits of the converted value and an interpolation value from the second subset of bits of the converted value; retrieving multiple values from a look-up table based on the index, the look-up table configured to store a plurality of values representing the non-linear activation function; and generating, at the activation accelerator, an estimated result of the non-linear activation function for the input value by interpolating between the multiple values from the look-up table based on the interpolation value.

A third aspect provides an activation accelerator configured to perform the method of the second aspect.

A fourth aspect provides a neural network accelerator comprising the activation accelerator of the first aspect or the third aspect.

The activation accelerators and the neural network accelerators described herein may be embodied in hardware on an integrated circuit. There may be provided a method of manufacturing, at an integrated circuit manufacturing system, an activation accelerator or a neural network accelerator as described herein. There may be provided an integrated circuit definition dataset that, when processed in an integrated circuit manufacturing system, configures the system to manufacture an activation accelerator or a neural network accelerator as described herein. There may be provided a non-transitory computer readable storage medium having stored thereon a computer readable description of an activation accelerator or a neural network accelerator described herein that, when processed in an integrated circuit manufacturing system, causes the integrated circuit manufacturing system to manufacture an integrated circuit embodying the activation accelerator or the neural network accelerator.

There may be provided an integrated circuit manufacturing system comprising: a non-transitory computer readable storage medium having stored thereon a computer readable description of an activation accelerator or a neural network accelerator described herein; a layout processing system configured to process the computer readable description so as to generate a circuit layout description of an integrated circuit embodying the activation accelerator or the neural network accelerator; and an integrated circuit generation system configured to manufacture the activation accelerator or the neural network accelerator according to the circuit layout description.

There may be provided computer program code for performing any of the methods described herein. There may be provided non-transitory computer readable storage medium having stored thereon computer readable instructions that, when executed at a computer system, cause the computer system to perform any of the methods described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which.

Figure 1:
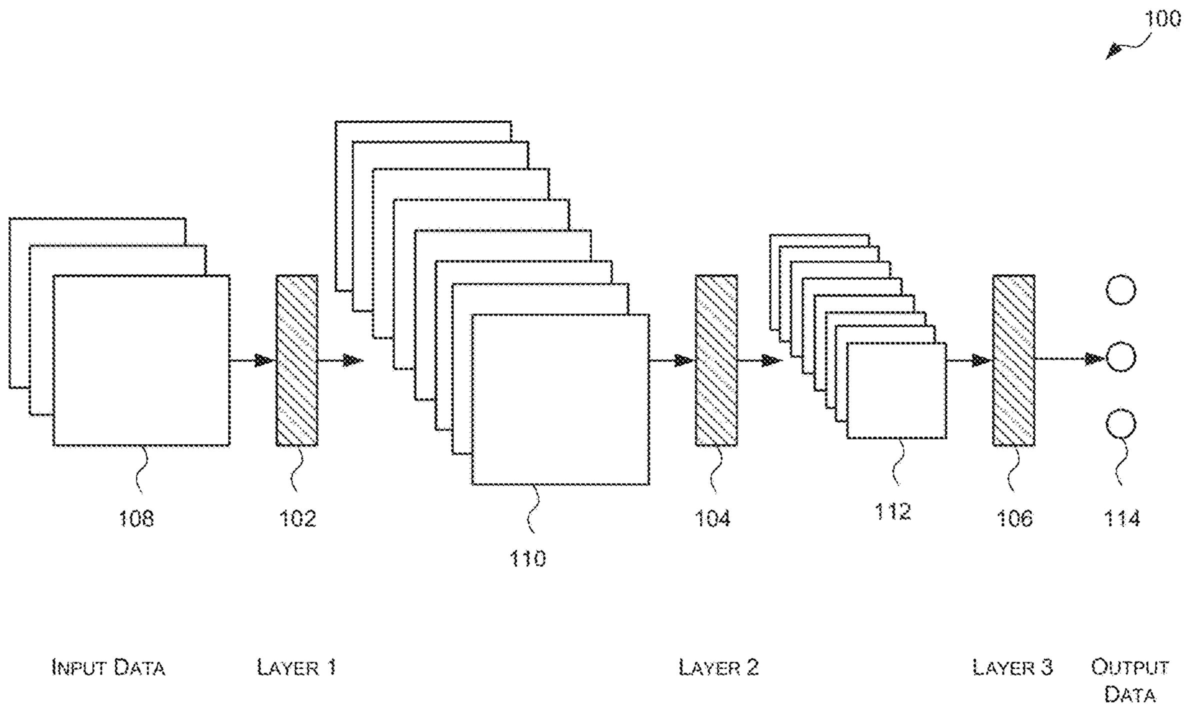
FIG. 1 is a schematic diagram of an example neural network.
Figure 2:
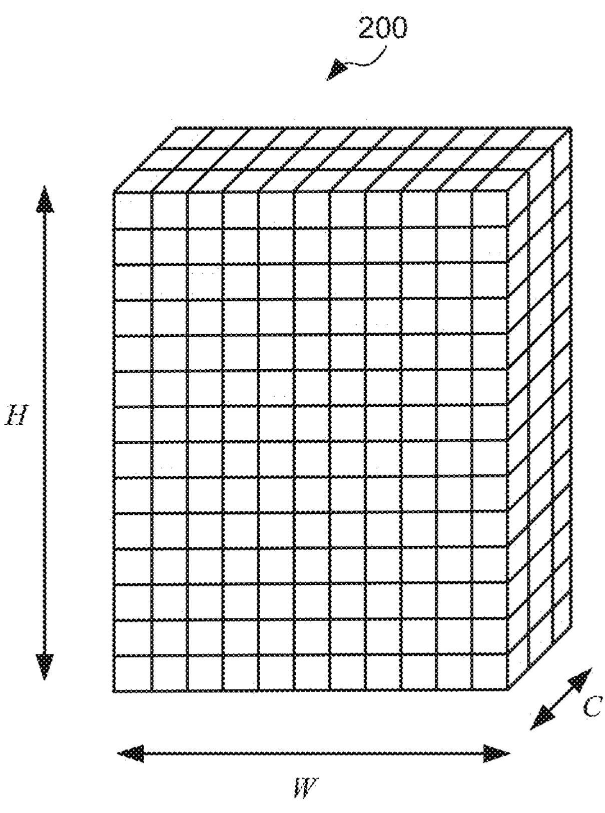
FIG. 2 is a schematic diagram illustrating an example tensor.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art.

Embodiments will now be described by way of example only.

As described above, neural networks are often expensive to implement in terms of computation, bandwidth and power. Accordingly, neural network accelerators (NNAs) have been developed that allow neural networks to be implemented in an efficient manner (e.g., in a manner that requires less silicon area or less processing power).

An NNA is hardware that is designed to accelerate the processing of a neural network. As is known to those of skill in the art, a hardware accelerator is hardware designed to perform a specific set of one or more functions more efficiently than a general processing unit, such as a central processing unit (CPU). Accordingly, in contrast to a general CPU which can be configured to perform any number of functions or operations, an accelerator can only perform a limited set of one or more functions or operations. NNAs comprise one or more hardware accelerators designed to accelerate one or more neural network operations. A neural network operation is defined herein as an operation that is used to implement all or a part of a neural network layer. A neural network layer may be implemented by one or more neural network operations. Example neural network operations include, but are not limited to, convolution operations, non-linear activation operations, pooling operations and normalisation operations.

An NNA may therefore have, for example, a convolution accelerator which is configured to accelerate convolution operations, an activation accelerator which is configured to accelerate non-linear activation operations, a pooling accelerator which is configured to accelerate pooling operations, and/or a normalisation accelerator configured to accelerate normalisation operations. It will be evident to a person of skill in the art that this is just an example set of accelerators that an NNA may have, and NNAs may have additional accelerators, fewer accelerators or a different combination of accelerators.

An activation accelerator is hardware that is configured to accelerate non-linear activation operations. Specifically, an activation accelerator is configured to apply a non-linear activation function, such as, but not limited to, a ReLU (rectified linear unit), Sigmoid, or Tan h function to values or elements of an input tensor. Accordingly, an activation accelerator receives input values, and applies a non-linear activation function to each of the input values to generate output values. Activation accelerators known to the Applicant, which is not admission that they are known outside of the Applicant company or are well-known, approximate the result of the non-linear activation function using a programmable look-up table (LUT). Specifically, the LUT is programmed with values of the non-linear activation function that is to be implemented. A portion of each input value is used to generate an index to the LUT. Two values are obtained from the LUT and are used to approximate the output of the non-linear activation function. For example, the activation accelerator may use a different portion of the input value to interpolate between the two LUT values.

Described herein are new activation accelerators for use in a neural network accelerator which are more flexible and/or more efficient than activation accelerators known to the Applicant. Accordingly, described herein is new hardware.

Figure 3:
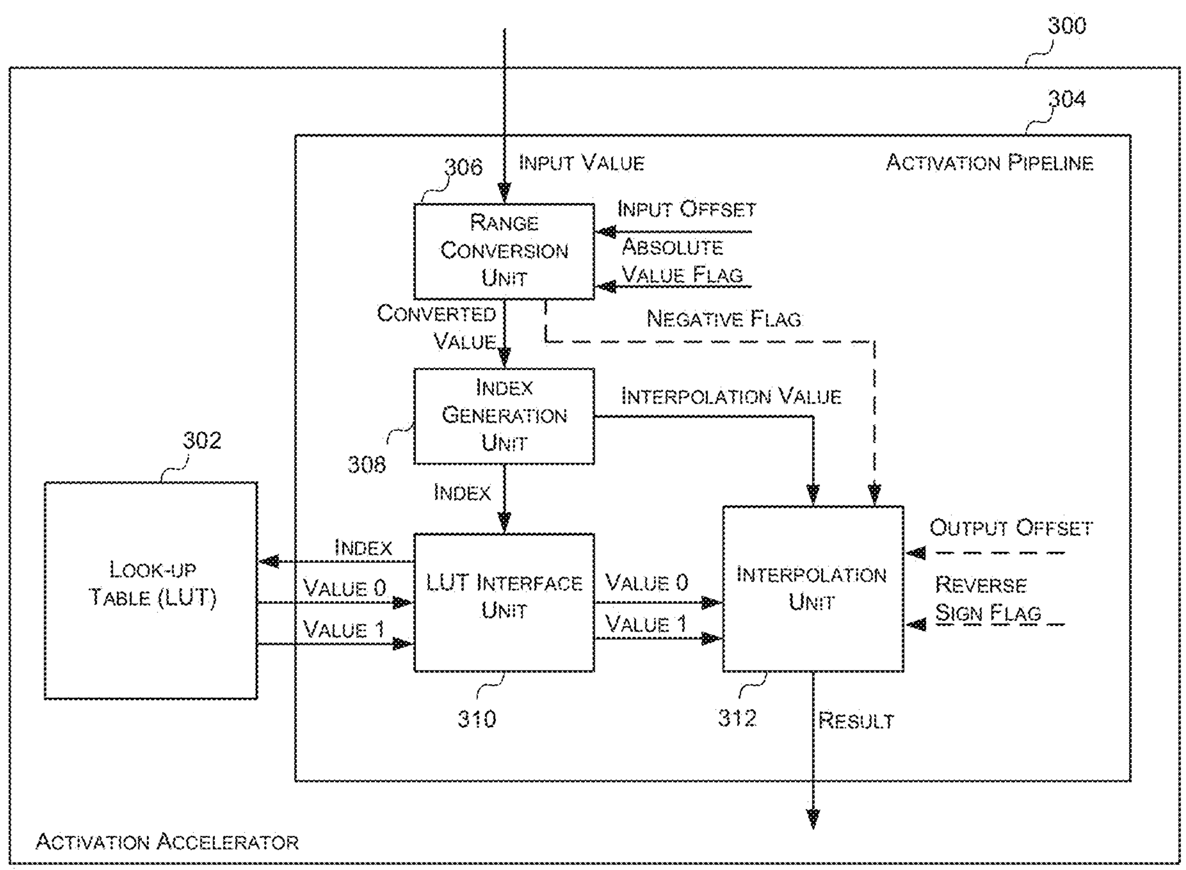
FIG. 3 is a block diagram of a first example activation accelerator.

Reference is now made to FIG. 3 which illustrates a first example activation accelerator 300. The activation accelerator 300 of FIG. 3 is designed to implement certain non-linear activation functions, such as, but not limited to, non-linear activation functions that are symmetric about the y, or output, axis, more efficiently and/or more accurately than activation accelerators known to the Applicant.

The activation accelerator 300 of FIG. 3 comprises a look-up table (LUT) 302 and one or more activation pipelines 304.

The LUT 302 is configured to store values that represent a non-linear activation function to be applied to input values. In some cases, each value in the LUT is associated with a specific input value, and the output of the non-linear activation function for an input value can be determined from the associated value(s). In some cases, each value stored in the LUT 302 may be equal to the output of the non-linear activation function for the associated input value. For example, for a non-linear activation function, $f$, the value stored in the LUT 302 for input value $x_1$ may be $f(x_1)$. In other cases, each value stored in the LUT 302 may be a value from which the output of the non-linear activation function for the associated input value can be determined. For example, for a non-linear activation function, $f$, the value stored in the LUT 302 for input value $x_1$ may be $f(x_1)-C$ where C is a constant.

The input values associated with the values in the LUT 302 may be equally spaced input values within an input value range. The input value range may be selected so as to cover an expected range of input values or a desired range of input values. The spacing between the input values associated with the values in the LUT 302 is based on the input value range and the number of values stored in the LUT 302. For example, if the LUT 302 can store 64 values, and the input value range is −62 to +64 then the LUT 302 may be configured to store values associated with even input values between −62 and +64. In contrast, if the LUT 302 can store only 32 values, and the input value range is −62 to +64 then the LUT 302 may be configured to store values associated with every $4^{th}$ input value between −62 and +64.

Each value stored in the LUT 302 is associated with an index or address which can be used to identify or retrieve that value from the LUT 302. The index for a LUT 302 value associated with a particular input value can be generated from the input value. For example, if the LUT 302 stores $f(x_1)$ the index for that value can be obtained from $x_1$.

The values may be stored in any suitable manner in the LUT 302. For example, as described in more detail below with respect to FIG. 10, in some cases, the LUT 302 may be subdivided into two sub-LUTs wherein one sub-LUT stores the values that correspond to even indices and another sub-LUT stores the values that corresponds to odd indices. However, this is an example only. In some cases, as described in more detail with respect to FIG. 10, the LUT 302 may support multiple different modes in which in each mode the values representing a non-linear activation function are stored in a different manner in the LUT 302. For example, in one mode the LUT 302 may be configured to store a first number of values with a first bit-width and in another mode the LUT 302 may be configured to store a second number of values with a second bit-width.

The LUT 302 is programmable so that the activation accelerator 300 can be configured to implement any number of non-linear activation functions. Accordingly, to apply a specific non-linear activation function to a set of input values the LUT 302 is programmed or loaded with the values that represent that specific non-linear activation function.

Each activation pipeline 304 is configured to receive input values and generate, for each input value, an estimate of the output of the non-linear activation function for that input value based on the values stored in the look-up table 302. Specifically, each activation pipeline 304 is configured to (i) generate, for each input value, an index which is used to identify values in the LUT 302 relevant to that input value, and (ii) generate an estimate of the non-linear activation function for that input value from the identified values. Each activation pipeline 304 comprises a range conversion unit 306, an index generation unit 308, a LUT interface unit 310 and an interpolation unit 312. Each unit 306, 308, 310, 312 may be implemented in hardware.

The range conversion unit 306 is configured to receive a plurality of input values and convert the received values into converted values that are in a numerical range suitable for indexing the LUT 302 (e.g. a positive integer range). The input values may be converted into values that are in a numerical range suitable for indexing the LUT 302 by converting the range of input values associated with the values in the LUT 302 to positive integers.

In activation accelerators known to the Applicant, which is not an admission that they are well-known or known outside the Applicant company, input values may be converted to a numerical range suitable for indexing the LUT 302 by combining (e.g. adding or subtracting) a configurable offset to each input value. Accordingly, the range conversion unit 306 of FIG. 3 may be configured to receive an input offset and combine each input value with the received input offset. In some cases, the range conversion unit 306 may be configured to combine the input value and the input offset by subtracting the input offset from the input value. In such cases, the input offset may be a signed integer so that a value can be added to, or subtracted from, the input values by changing the sign of the input offset. In some cases the input offset may be a 32-bit value. In some cases, the input value may be a 32-bit value. Using 32-bit input values and 32-bit output values allows the activation accelerator 300 to support non-linear activation functions at a precision that corresponds to the precision supported by development tools such as, but not limited to, TensorFlow Lite. Where the input value and the input offset are both 32-bit signed integers, the converted value may be a 33-bit signed integer. It will be evident to a person of skill in the art that this is an example only and that the input value and the input offset may be combined in any suitable manner to obtain values in a numerical range suitable for indexing the LUT 302.

The input offset for a set of input values may be selected based on the input value range associated with the values in the LUT 302. For example, if the values in the LUT 302 are associated with input values in the range [−128, 127] the input offset may be set to −128 so that the input values in this range are mapped to converted values in the range [0, 255].

In addition to being able to combine the received input values with a configurable input offset, the range conversion unit 306 also can, instead of outputting the combination of the input value and the input offset, output the absolute value of the combination. Specifically, the range conversion unit 306 of FIG. 3 is configured to receive, in addition to a configurable input offset, an absolute value flag which indicates whether the absolute value of the combination is to be output. If the absolute value flag does not indicate that the absolute value is to be output (e.g. if the absolute value flag is not set) then the range conversion unit 306 is configured to output the combination of the input value and the input offset. If, however, the absolute value flag indicates that the absolute value is to be output (e.g. if the absolute value flag is set) then the range conversion unit 306 is configured to output the absolute value of the combination of the input value and the offset. In some cases, the absolute value flag may be a Boolean value which may be set to true if the absolute value is to be output and set to false if the absolute value is not to be output. However, the absolute value flag may take any suitable form, such as an asserted signal, a single bit, a combination of more than one bit, or one or more bits selected from a wider bit string.

In some cases, where the range conversion unit 306 is configured to combine the input value and the input offset by subtracting the input offset from the input value, the range conversion unit 306 may be configured to output the absolute value of the combination by outputting the combination (the input value less the input offset (i.e., input value-input offset)) if the input value is greater than, or equal to, the input offset, and outputting the input offset less the input value (i.e., input offset-input value) if the input value is less than the input offset. The following is pseudocode which represents the functionality of the range conversion unit 306 in such cases where input is the input value, offset is the input offset, absolute_value_flag is the absolute value flag and converted_value is the converted value that is output for the input value.

```
If (input<offset && absolute_value_flag)
    converted_value=offset−input;
else
    converted_value=input−offset;
```

Figure 4:
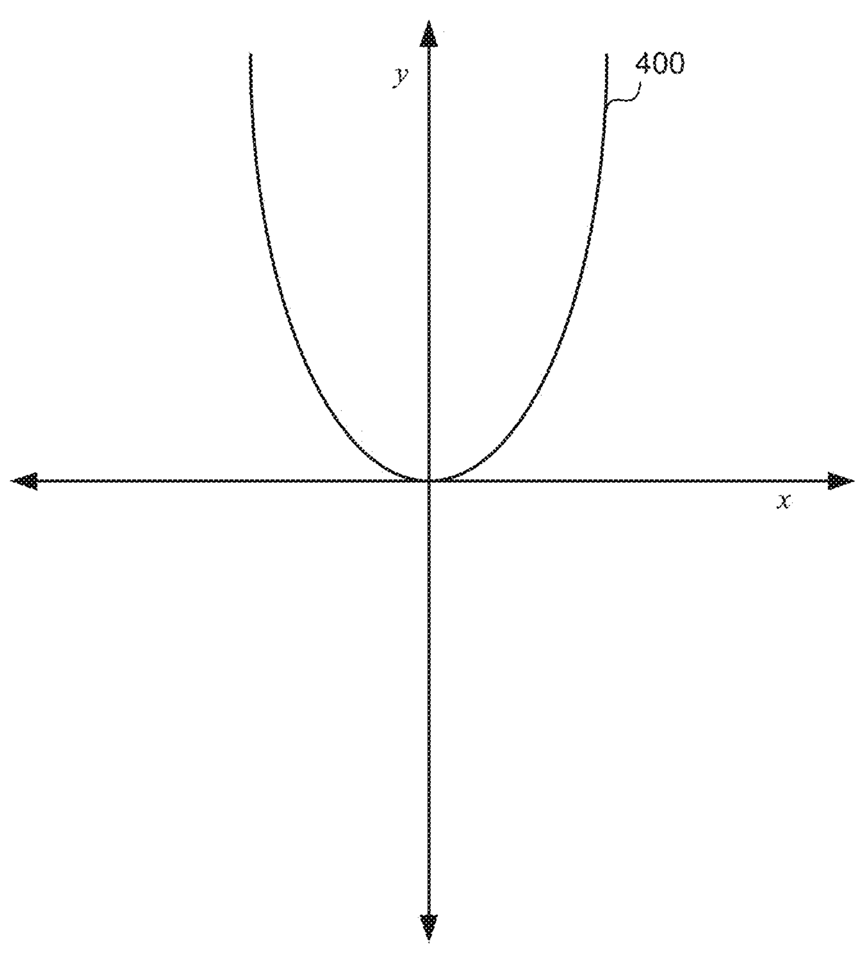
FIG. 4 is a schematic diagram of an example function that is symmetric with respect to the y, or output, axis.

Being able to output the absolute value of the combination allows non-linear activation functions that are symmetric with respect to the y, or output, axis to be implemented more efficiently or more accurately. A function that is symmetric with respect to the y, or output, axis may be referred to as an even function. A function $f$ is even if $f(-x)=f(x)$ for all possible values of x. An example function 400 that is symmetric with respect to the y, or output, axis is shown in FIG. 4. Where the non-linear activation function that the activation accelerator 300 is to implement is an even function then if the output of the non-linear activation function is $y_1$ for a specific input value $x_1$, then the output of the non-linear activation function is also $y_1$ for $-x$. This means that an activation accelerator can implement a non-linear activation function that is symmetric with respect to the y, or output, axis over positive and negative input values using only LUT 302 values for positive input values. This allows, either less values to be stored in the LUT 302 to achieve the same accuracy, or more values to be stored in the same-sized LUT 302 to improve the accuracy or precision.

For example, if the activation accelerator 300 is configured to apply an even non-linear activation function to input values in the range [−128, 127], instead of storing values in the LUT 302 that are associated with the input values in the range [−128, 127], only the values associated with input values in the range [0, 128] need to be stored in the LUT 302 and the output for negative input values can simply be determined from values in the LUT 302 associated with the corresponding positive input values. This means that instead of using converted values in the range [0, 255] to index the LUT by, as described above, subtracting −128 from each input value, converted values in the range [0, 128] can be used to index the LUT 302 by outputting the absolute value of the input values. This can be achieved in the range conversion unit 306 of FIG. 3 by setting the input offset to zero and setting the absolute value flag.

The index generation unit 308 is configured to generate an index and an interpolation value from each converted value generated by the range conversion unit 306. The index is used to identify and retrieve a plurality of values from the LUT 302 which are relevant to the input value and the interpolation value is used to interpolate between the plurality of values retrieved from the LUT 302. In some cases, the index may be configured to identify the value in the LUT 302 that is associated with the closest input value to the input value being processed. For example, if the LUT 302 is configured to store values associated with input values 1, 6 and 9, and the input value being processed is 2 then the index may identify the value in the LUT 302 associated with input value 1. The index is generated from one or more bits of the converted value and the interpolation value may be generated from one or more bits of the converted value or may be set to zero.

The index generation unit 308 may be configured to generate an index and an interpolation value from each converted value in any suitable manner.

In some cases, the specific bits of the converted value which are used to generate the index and the interpolation value may be fixed. For example, in some cases, where the index is A bits and the interpolation value is B bits, the least significant A+B bits of the converted value may be used to generate the index and the interpolation value. Specifically, the B least significant bits (LSBs) of the converted value may be used to generate the interpolation value and the next A LSBs may be used to generate the index.

In such cases, the range conversion unit 306 may be configured such that input values in the range of input values associated with the values in the LUT 302 will be mapped to converted values in the A+B bit unsigned integer range, and input values that fall outside that input value range will be mapped to converted values outside the A+B bit unsigned integer range (i.e., they may be mapped to converted values that are less than or greater than the A+B bit unsigned integer range). If an input value falls outside the range of input values associated with the values in the LUT 302, then there may not be a set of values in the LUT 302 from which the result or output of the non-linear activation function for that input value can be accurately estimated. Therefore the output of the non-linear activation function for an input value that falls outside the range of input values associated with the LUT 302 values may be estimated to be the output of the non-linear activation function for the closest input value in the range. Specifically, the output of a non-linear activation function for input values greater than the maximum input value in the range of input values associated with the LUT 302 values may be estimated to be the output of the non-linear activation function for the maximum input value in that range of input values, and the output of a non-linear activation function for input values less than the minimum input value in the range of input values associated with the LUT 302 values may be estimated to be the output of the non-linear activation function for the minimum input value in the range.

To implement this, the index generation unit 308 may be configured to clamp the converted value to an A+B bit unsigned integer and output the B LSBs of the clamped value as the interpolation value and output the A most significant bits (MSBs) of the clamped value as the index. As is known to those of skill in the art, clamping a value to an A+B bit unsigned integer comprising outputting 0 if the received value is less than 0, outputting the maximum value representable as an A+B bit unsigned integer if the received value is greater than the maximum value representable as an A+B bit unsigned integer (i.e. $2^{A+B}-1$), and outputting the received value otherwise. In such cases, the index generation unit 308 may comprise a clamp unit (not shown) to perform the clamping and a split unit (not shown) configured to split the output of the clamp unit into the index and the interpolation value.

In other cases, the specific bits of the converted value which are used to generate the index and/or the interpolation value may be configurable. For example, in some cases, prior to clamping the converted value to an unsigned integer of A+B bits, the index generation unit 308 may be able to shift the converted value left or right a configurable number of bits such that a different set of bits of the converted value are used to generate the index and/or the interpolation value. An index generation unit in which the specific bits of the converted value that are used to generate the index and the interpolation value is configurable is described below with respect to FIG. 8.

In some cases, the clamping performed by the index generation unit 308 may be disabled to allowed periodic non-linear activation functions to be accurately implemented over a wider range of input values. In such cases, the index generation unit 308 may be configured to receive a disable clamp flag (not shown), or the like, that indicates whether clamping is to be disabled. When the disable clamp flag is not set then the index generation unit 308 may be configured to clamp the received converted value, and when the disable clamp flag is set then the index generation unit 308 may be configured to output the A+B LSBs of the converted value. A periodic function, also known as a cyclic function, is a function that repeats its values at regular intervals. Example periodic functions include, but are not limited to trigonometric functions, such as sine and cosine. Since a periodic function repeats its values, if the values in the LUT 302 are associated with a set of input values that covers one interval or period, the LUT 302 will have values from which the output of the non-linear activation function can be generated for any input value.

Figure 5:
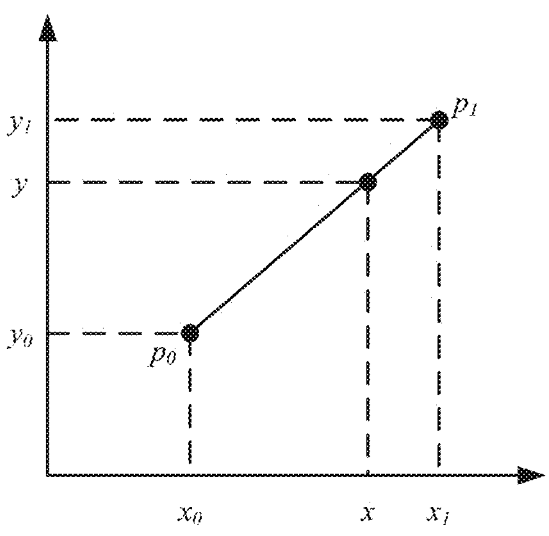
FIG. 5 is a schematic diagram illustrating linear interpolation.

The LUT interface unit 310 is configured to obtain a plurality of values stored in the LUT 302 based on the index generated by the index generation unit 308. The number of values that are obtained from the LUT 302 are dependent on the interpolation technique implemented by the interpolation unit 312. Example interpolation techniques include, but are not limited to, linear interpolation and quadratic interpolation. As is known to those of skill in the art, in linear interpolation the output, y, of a function for an input value, x, is approximated from the known output of the function for two other input values using linear polynomials. Specifically, as shown in FIG. 5, given two known data points $p_0$, $p_1$, of the function, denoted $(x_0, y_0)$ and $(x_1, y_1)$ respectively, the output, y, for an input value, x between these points, is estimated as the y-value along the straight line between $p_0$ and $p_1$ at x. Accordingly, if the interpolation unit 312 is configured to perform linear interpolation then the LUT interface unit 310 may be configured to use the index to obtain $y_0$ and $y_1$ where $x_0$ and $x_1$ represent the input values in the discrete set of input values that correspond to the values stored in the LUT 302 that are closest to the received input value. In contrast, in quadratic interpolation the output, y, of a function for an input value, x, is approximated from the known output of the function for three other input values using a quadratic polynomial. Accordingly, if the interpolation unit 312 is configured to perform quadratic interpolation then the LUT interface unit 310 may be configured to obtain three values from the LUT 302.

The interpolation unit 312 is configured to generate an estimate of the output or result of the non-linear activation function for an input value from an interpolation output. In some cases the estimated output or result may be a 32-bit value. The interpolation unit is configured to generate the interpolation output by interpolating between the plurality of values retrieved from the LUT 302 using the interpolation value. As is known to those of skill in the art, interpolation is the process of predicting the value of a function based on known values of the function. The interpolation unit 312 may be configured to interpolate between the plurality of values of the LUT 302 using the interpolation value using any suitable interpolation technique.

In some cases, the interpolation unit 312 may be configured to perform linear interpolation between a pair of values obtained from the LUT 302 using the received interpolation value as described above with respect to FIG. 5. The interpolation unit may be configured to perform linear interpolation between two values $y_0$ and $y_1$ obtained from the LUT 302 using the interpolation value received from the index generation unit 308 to estimate the output, y, of a non-linear activation function for an input value, x, by implementing equation (1) wherein INTERP is the interpolation value and INTERPBITS is the number of bits of the interpolation value. It will be evident to a person of skill in the art that this is an example only.

$$y = \frac{y_0 \cdot 2^{INTERPBITS} + (y_1 - y_0) \cdot INTERP}{2^{INTERPBITS}} \tag{1}$$

In some cases, the range conversion unit 306 may also be configured to generate a negative flag wherein the range conversion unit 306 is configured to set (or enable) the negative flag if the combination of the input value and the input offset is negative, and not set (or disable) the negative flag if the combination of the input value and the input offset is not negative. In such cases, the interpolation unit 312 may be configured to receive the negative flag generated by the range conversion unit 306 and a reverse sign flag that indicates whether the sign of the estimated result is to be reversed, and the interpolation unit 312 may be configured to reverse the sign of the estimated result when both the negative flag and the reverse sign flag is set. For example, if the estimated result for an input value is "5" and the negative flag is set and the reverse sign flag is set, then the interpolation unit 312 may be configured to output "−5" instead.

Figure 6:
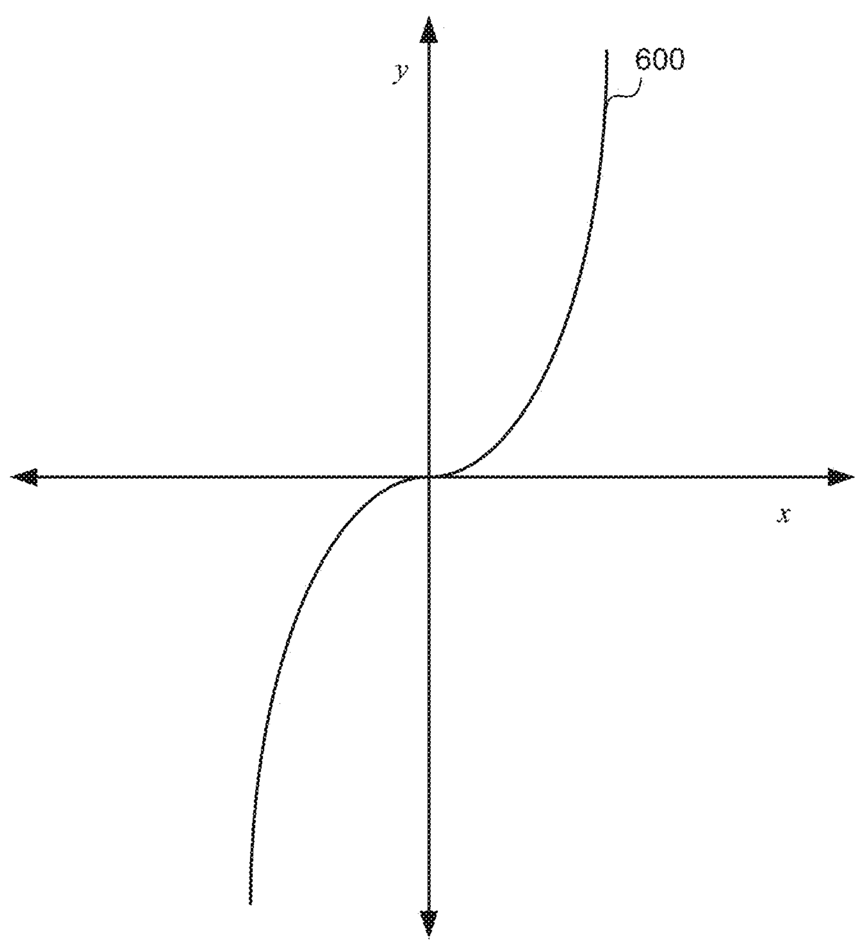
FIG. 6 is a schematic diagram of an example function that is symmetric with respect to the origin.

The ability of the interpolation unit 312 to selectively reverse the sign of the estimated result, in combination with the ability of the range conversion unit 306 to output the absolute value of the combination of the input value and the input offset, allows the activation accelerator 300 to implement non-linear activation functions that are symmetric with respect to the origin more efficiently or more accurately. A function that is symmetric with respect to the origin may be referred to as an odd function. A function $f$ is odd if $f(-x)=-f(x)$ for all possible values of x. In other words, a function is odd if it remains the same if it is rotated 180 degrees about the origin. An example function 600 that is symmetric with respect to the origin is shown in FIG. 6.

Accordingly, if the output of an odd non-linear activation function is $y_1$ for a specific input value $x_1$, then the output of the non-linear activation function for $-x_1$ is $-y_1$. This means that the activation accelerator 300 can implement a non-linear activation function that is symmetric with respect to the origin over positive and negative input values using only values associated with positive input values and then reversing the sign of the output for negative input values. This allows either less values to be stored in the LUT 302 to achieve the same accuracy, or more values to be stored in the same-sized LUT 302 to improve the accuracy or precision.

For example, if the activation accelerator 300 is configured to apply an odd non-linear activation function to input values in the range [−128, 127], instead of storing values in the LUT associated with input values in the range [−128, 127], only values associated with input values in the range [0, 128] need to be stored in the LUT and the output for negative inputs can be estimated from the values in the LUT for the corresponding positive inputs. This means that instead of converting input values in the range [−128, 127] to converted values [0, 255] by, as described above, subtracting −128 from each input value, input values in the range [−128, 127] can be converted to input values in the range [0, 128] by configuring the range conversion unit 306 to output the absolute value of the input values by setting the offset to zero and setting (or enabling) the absolute value. The interpolation unit 312 can then be configured to reverse the sign of the estimated output for negative input values by setting (or enabling) the reverse sign flag.

Where the interpolation unit 312 can selectively reverse the sign of the estimated result for negative input values, the interpolation unit 312 may, in some cases, also be configured to receive an output offset and the interpolation unit 312 may be configured to generate the estimated result by combining the interpolation output and the output offset. In some examples, the interpolation unit 312 may be configured to combine the interpolation output and the output offset by adding the interpolation output and the output offset. In such cases, the interpolation unit 312 may be configured to reverse the sign of the estimated result (when the negative flag is set and the reverse sign flag is set) by, instead of adding the offset to the interpolation output, subtracting the interpolation output from the output offset.

Figure 7:
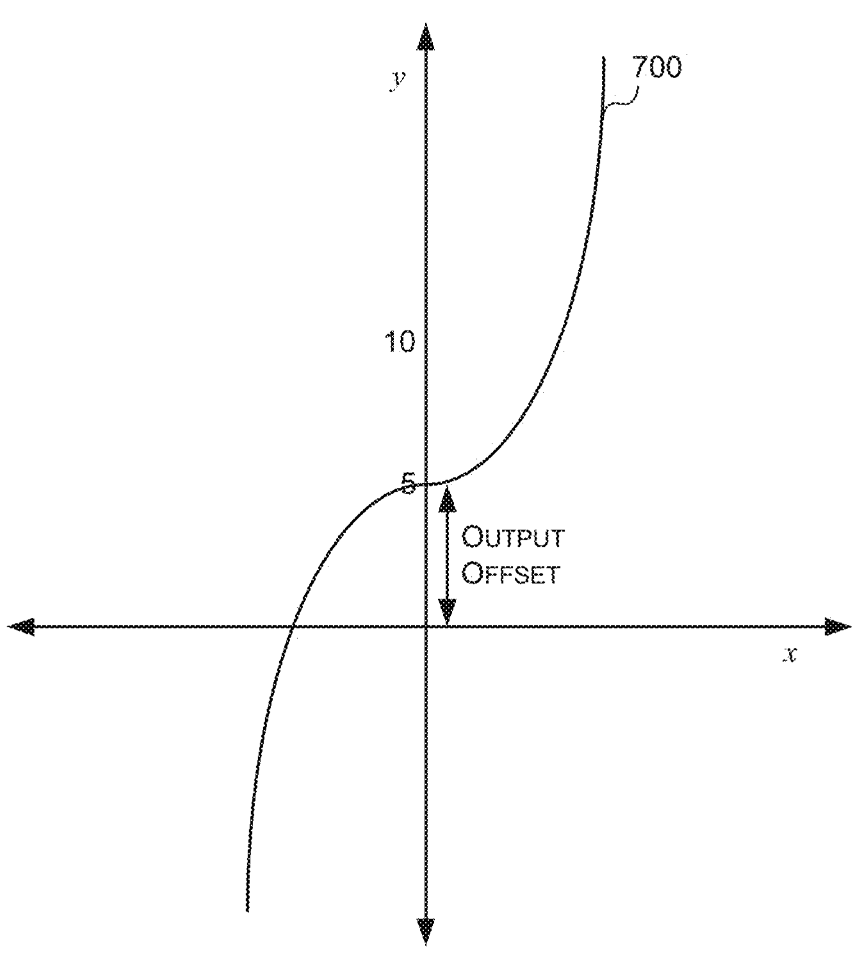
FIG. 7 is a schematic diagram of an example function that is symmetric with respect to (0, 5)

This ability to add an offset to the interpolation output to generate the estimated result allows the activation accelerator 300 to implement non-linear activation functions that are symmetric with respect to other points along the y axis (other than the origin) in the same efficient manner as non-linear activation functions that are symmetric with respect to the origin. In other words, the same range of input values can be supported with the same accuracy using half as many LUT entries or the accuracy can be increased by storing more LUT entries that relate to the same range. Specifically, the output offset allows the point of symmetry to be shifted up or down along the y, or output, axis. For example, FIG. 7 shows a function 700 that is symmetric with respect to (0, 5). Such a function can be implemented efficiently by the activation accelerator 300 by storing in the LUT 302 values that represent a version of the function 700 that is shifted down by 5 so as to be symmetric with respect to the origin (e.g. storing values in the LUT 302 that represent $f(x)-5$ where $f(x)$ is the function 700 shown in FIG. 7); setting the input offset to zero and setting the absolute value flag so as to cause the range conversion unit 306 to output the absolute value of the input values for use in indexing the LUT 302; setting the output offset to 5 and setting the reverse sign flag so as to cause the interpolation unit 312 to add 5 to the interpolation outputs corresponding to the non-negative input values and to subtract the interpolation outputs corresponding to the negative input values from 5 to generate the estimated result.

In some cases, depending on the range of values for the non-linear activation function, $f(x)$, being implemented it may not be possible to accurately store $f(x)$–C in the LUT 302, where C is a constant equal to the output offset. For example, if $f(x)$ is a 16-bit signed integer then $f(x)$–C will be a 17-bit signed integer. However, if the LUT 302 can only store 16-bit values it will not be able to accurately store $f(x)$–C. Accordingly, in some cases the LUT 302 may be configured to store values in the LUT 302 that represent $f(x)$ and the constant C may be removed from the values read from the LUT 302 by, for example, the interpolation unit 312. In other cases, $f(x)$–C may be computed with a clip to discard the top bit, such that it wraps.

In some cases, the output offset may be a signed integer. In some cases, the output offset may be a 32-bit value.

Although the absolute value feature of the range conversion unit 306, the reverse sign (and output offset) features of the interpolation unit 312, and the ability to disable clamping in the index generation unit 308 have been described as being designed to implement certain non-linear activation functions more efficiently, these features may be combined in a variety of manners to implement other operations and functions efficiently. Table 1 lists an example set of operations and functions which can be implemented efficiently by the activation accelerator 300 of FIG. 3 using different combinations of these features wherein m is a constant, % is the modulo operation, nbits is the number of bits in the input and x_max is the value obtained by interpolating with the values in the LUT 302 associated with the last two indices.

TABLE 1

| Operation | Absolute Value | Reverse Sign | Clamping Enabled | Example Function |
|---|---|---|---|---|
| $f(-x) = f(2^{nbits} - x)$ | — | — | — | Periodic sawtooth function: $f(x) = \begin{cases} x & \text{if } x \geq 0 \\ 2^{nbits} - x & \text{otherwise} \end{cases}$ |
| $f(-x) = f(0)$ | — | — | X | f(x) = min(max(m * x, 0), x_max) |
| $f(-x) = -f(2^{nbits} - x)$ | — | X | — | |
| $f(-x) = -f(0)$ | — | X | X | |
| $f(-x) = f(x)$ | X | — | — | f(x) = abs (x % x_max) |
| $f(-x) = f(x)$ | X | — | X | f(x) = min(abs(x), x_max) |
| $f(-x) = -f(x)$ | X | X | — | f(x) = m * (x % x_max) |
| $f(-x) = -f(x)$ | X | X | X | f(x) = m * min (x, x_max) |

Although FIG. 3 shows a single activation pipeline, in other examples, the activation accelerator may comprise multiple activation pipelines. Having multiple activation pipelines allows multiple input values to be processed in parallel. In some cases each activation pipeline may use the same LUT 302 values. In other words, in some cases, all the activation pipelines may implement the same non-linear activation function. In some cases, there may be a single set of storage elements (e.g. registers) which store the LUT 302 values, and each of the activation pipelines have access to the single set of storage elements. In other words, there may be a single copy of the LUT 302 which all activation pipelines have access to. In such cases, there may be hardware (e.g. a set of multiplexors) which control access to the single set of storage elements. In other cases, each activation pipeline may have its own set of storage elements (e.g. registers) which store the LUT values. In other words, each activation pipeline may have its own copy of the LUT 302. In some cases it may be more hardware efficient, in terms of silicon area and/or complexity, to have a set of storage elements for each activation pipeline rather than having hardware (e.g. a set of multiplexors) which control access to the single set of storage elements. The comments in this paragraph equally apply to all of the activation accelerators described herein. Specifically, any of the activation accelerators described herein may have multiple activation pipelines and each activation pipeline may have their own copy of the LUT or all of the activation pipelines may all share a single copy of the LUT.

Figure 8:
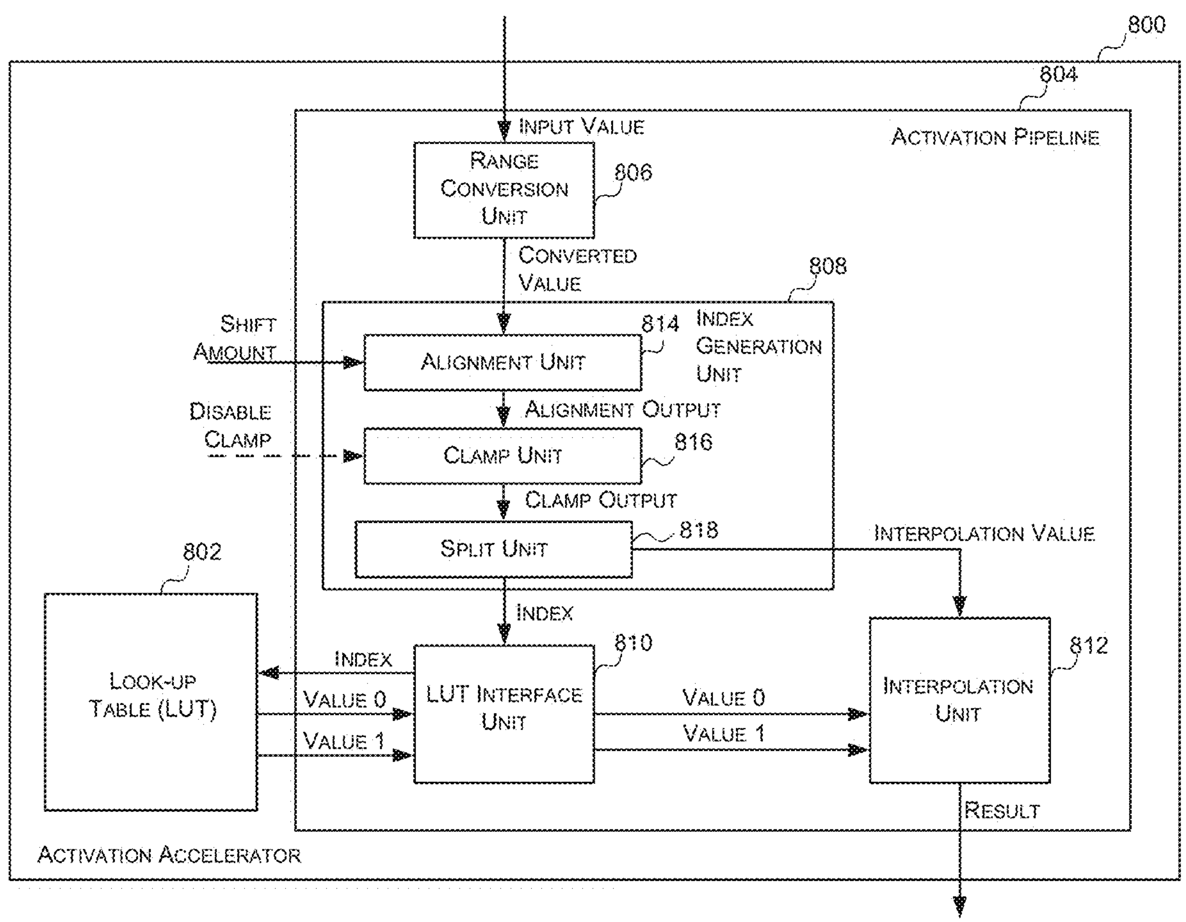
FIG. 8 is a block diagram of a second example activation accelerator.

Reference is now made to FIG. 8 which illustrates a second example activation accelerator 800 in which the bits of the converted value which are used to generate the index and interpolation value are configurable or selectable.

The activation accelerator 800 of FIG. 8 comprises a look-up table (LUT) 802 and one or more activation pipelines 804.

The LUT 802, like the LUT 302 of FIG. 3, is configured to store values that represent a non-linear activation function to be applied to input values. In some cases, each value in the LUT is associated with a specific input value, and the output of the non-linear activation function for the associated input value can be determined from the associated value(s). In some cases, each value stored in the LUT 802 may be equal to the output of the non-linear activation function for the associated input value. In other cases, each value stored in the LUT 802 may not be equal to the output of the non-linear activation function for the associated information but instead may comprise information or data from which the output of the non-linear activation function for the associated input value can be determined.

The input values associated with the values of the LUT 802 may be equally spaced input values within a predetermined range. The spacing between the input values associated with the values in the LUT 802 may be based on, for example, the predetermined range and the number of values stored in the LUT 802.

Each value stored in the LUT 802 is associated with an index or address which can be used to identify or retrieve that value from the LUT 802. The index for a LUT value associated with a particular input value can be generated from the input value.

The values may be stored in any suitable manner in the LUT 802. For example, as described in more detail below with respect to FIG. 10, in some cases, the LUT 802 may be subdivided into two sub-LUTs wherein one sub-LUT stores the values that correspond to even indices and another sub-LUT stores the values that corresponds to odd indices. However, this is an example only. In some cases, as described in more detail with respect to FIG. 10, the LUT 802 may support multiple different modes in which in each mode the values representing a non-linear activation function are stored in a different manner in the LUT 802. For example, in one mode the LUT 802 may be configured to store a first number of values with a first bit-width and in another mode the LUT 802 may be configured to store a second number of values with a second bit-width.

Each activation pipeline 804 is configured to receive input values and generate an estimate, for each input value, the result of applying the non-linear activation function to that input value based on the values stored in the look-up table 802. Each activation pipeline 804 comprises a range conversion unit 806, an index generation unit 808, a LUT interface unit 810 and an interpolation unit 812. Each unit 806, 808, 810, 812 may be implemented in hardware.

The range conversion unit 806 is configured to receive a plurality of input values and convert the received input values into converted values which are in a numerical range suitable for indexing the LUT 802 (e.g. a positive integer range). The range conversion unit 806 may be configured to generate the converted values from the input values in any suitable manner. For example, in some cases the range conversion unit 806 may be configured to receive an input offset which can be combined with the input values to generate the converted values. In other cases, the range conversion unit 806 may be configured, as described above with respect to FIG. 3, to receive both an input offset and absolute value flag and output the combination of the input value and the input offset when the absolute value is not set, and output the absolute value of the combination of the input value and the input offset when the absolute value flag is set so as to be able to implement non-linear activation functions that are symmetric with respect to the y, or output, axis and/or non-linear activation functions that are symmetric with respect to the origin more efficiently.

The index generation unit 808 is configured to generate an index and an interpolation value from each converted value received from the range conversion unit 806. As described below, the index is used to identify and retrieve a plurality (e.g. a pair) of values from the LUT 802 which are relevant to the input value and the interpolation value is used to interpolate between the plurality of values retrieved from the LUT 802. The index is generated from one or more bits of the converted value and the interpolation value may be based on one or more bits of the converted value or may be set to zero.

The index generation unit 808, in contrast to index generation units of activation accelerators known to the Applicant, allow the bits of a received converted value to be dynamically selected. Specifically, in index generation units of activation accelerators known to the Applicant, a fixed set of bits of the converted value may be used to generate the index. For example, as described above, where the index is A bits and the interpolation value is B bits the least significant A+B bits of the converted value may be used to generate the index and the interpolation value. Specifically, the B LSBs of the converted value may be used to generate the interpolation value and the next A LSBs may be used to generate the index. In contrast, the index generation unit 808 of FIG. 8 is configured to receive information identifying (i) a first subset of bits of the converted value to be used to generate the index; and (ii) a second subset of bits of the converted value to be used to generate the interpolation value; and generate the index from the first subset of bits of the converted value and generate the interpolation value from the second subset of bits of the converted value.

In some cases, the index generation unit 808 may comprise an alignment unit 814 which is configured to receive the information identifying the first and second subsets of bits of the converted value and generate an alignment output in which the first subset of bits of the converted value is in a first set of bit positions of the alignment output and the second subset of bits of the converted value is in a second set of bit positions of the alignment output. The index generation unit 808 may then be configured to generate the index from the first set of bit positions of the alignment output and generate the interpolation value from the second set of bit positions of the alignment output.

In some cases, the alignment unit 814 may be implemented as a shift unit which can apply a right or left shift to each converted value to generate a corresponding alignment output. In these cases, the information identifying the first and second subsets of bits of the converted value may comprise information identifying a shift amount and a shift direction, and the alignment unit 814 may be configured to generate the alignment output by shifting the converted value in the identified shift direction by the identified shift amount. In some cases, the information identifying the shift amount and the shift direction may be a signed shift value wherein the magnitude of the signed shift value identifies the amount of the shift (i.e., the number of bits of the shift) and the sign of the signed shift value identifies the direction of the shift (e.g. left or right). In some examples, a negative signed shift value indicates a right shift and a positive signed shift value indicates a left shift. However, it will be evident to a person of skill in the art that this is an example only and that in other examples a negative signed shift value may indicate a left shift.

Figure 9:
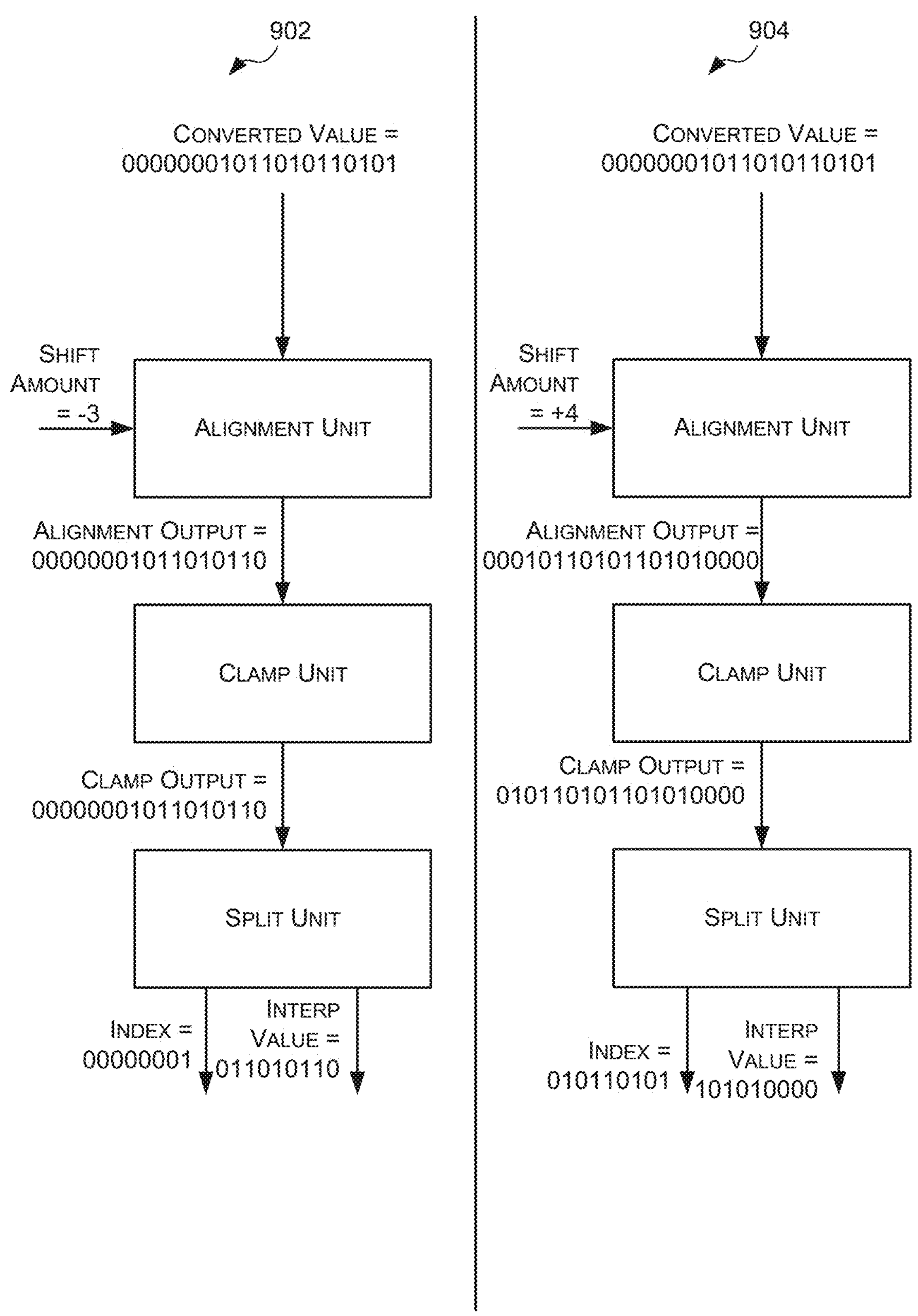
FIG. 9 is a schematic diagram illustrating left and right shifting of the converted value generated by the range conversion unit.

Shifting the converted value to the right allows more significant bits of the converted valued to be used in generating the index and the interpolation value. FIG. 9 illustrates at 902 the effect on the index and interpolation value of applying a right shift to an example converted value. A right shift may be used when the converted values are expected in a range greater than an A+B unsigned integer range, wherein B is the number of interpolation bits and A is the number of index bits, so that the most significant bits of each converted value that have useful information are used to create the index and the interpolation value. In contrast, shifting the converted value to the left allows less significant bits of the converted value to be used to generate the index and the interpolation value. FIG. 9 illustrates at 904 the effect on the index and interpolation value of applying a left shift to an example converted value. In some cases, the index generation unit 808 may be configured to use, as the default (e.g. with no shift), the B least significant bits of the converted value to generate the interpolation value, and the next A least significant bits of the converted value to generate the index, where B is the number of interpolation bits and A is the number of index bits. Accordingly, any shift of the converted value to the left causes one or more of the bits used to generate the interpolation value to be zero. A left shift may be used when the converted values are expected to be less than the maximum of a B-bit unsigned integer such that, without a left shift, the bits of the alignment output which are used to generate the index will be equal to zero. Accordingly, in general, the alignment unit allows the most significant bits of each converted value that contain useful information (i.e., are not always expected to be zero) to be used to generate the index to the LUT. The most significant bits of a converted value that contains useful information may be based on the expected range of the converted values.

In some cases, there may be restrictions on the amount of shift in one or both shift directions. For example, there may be a first maximum shift amount in the first shift direction (e.g. left shift) and there may be a second, different, maximum shift amount in the second shift direction (e.g. right shift). The maximum shift amounts may be based on, for example, the number of bits in the converted value, the number of bits in the index, and/or the number of bits in the interpolation value. In some cases, the first maximum shift amount (i.e., the maximum left shift amount) may be B wherein the interpolation value is B bits. For example, if the interpolation value is nine bits then the first maximum shift amount (i.e. maximum left shift amount) may be nine bits. This ensures that zeros are not placed in the LSBs of the index which would allow only a fraction of the LUT entries to be used. Specifically, making n of the LSBs of the index zero means that only ½n of the LUT entries can be used. For example if the LSB of the index is forced to zero, only ½ of the LUT entries can be used, and if the two LSBs of the index are forced to zero, only ¼ of the LUT entries can be used. In these cases, if a left shift of the maximum left shift amount is performed the interpolation value will be zero. In such cases, it may be advantageous to disable the interpolation unit 812. Accordingly, in some cases the interpolation unit 812 may be configured to receive a disable interpolation disable flag which, when set, causes the interpolation unit 812 to be disabled (e.g. not perform interpolation). In these cases, the disable interpolation flag may be set when the alignment unit 814 is configured to perform a left shift of the maximum left shift amount.

In some cases, the second maximum shift amount (i.e., the maximum right shift) may be Z−A−B where the interpolation value has B bits, the index has A bits and the converted value generated by the range conversion unit 806 has Z bits. For example, if the index and the interpolation value are both nine bits, and the converted value is 33 bits then the second maximum shift amount (i.e. the maximum right shift) may be 15 bits. This ensures that you are not forcing any of the bits used to generate the index and interpolation value to zero. Specifically, it ensures that A bits of the converted value are used to generate the index and B bits of the converted value are used to generate the interpolation value.

In some cases, as shown in FIG. 8, the index generation unit 808 may further comprise a clamp unit 816 and a split unit 818 which work together to generate the index and the interpolation value from the alignment output generated by the alignment unit 814. Specifically, the index generation unit 808 and the split unit 818 are configured to generate the index from the first set of bit positions of the alignment output and generate the interpolation value from the second set of bit positions of the alignment output.

As described above, the LUT 802 may comprise values or data points of the non-linear activation function that correspond to a predetermined range of input values. The range conversion unit 806 and the alignment unit 814 may be configured such that input values in that predetermined range will have an alignment output in the A+B bit unsigned integer range and input values outside that predetermined range will have alignment outputs that do not fall within the A+B bit unsigned integer range (i.e., they may be less than the minimum value in the A+B bit unsigned integer range or they may be greater than the maximum value in the A+B bit unsigned integer range). If an input value falls outside the predetermined range of input values then there may not be a set of values in the LUT 802 from which the output of the non-linear activation function for that input value can be accurately estimated. Therefore the output of the non-linear activation function for an input value that falls outside the predetermined range of input values may be estimated to be the output of the non-linear activation function for the closest input value in the range. Specifically, the output of a non-linear activation function for input values greater than the maximum input value in the predetermined range may be estimated to be the output of the non-linear activation function for the maximum input value in the predetermined range, and the output of a non-linear activation function for input values less than the minimum input value in the predetermined range may be estimated to be the output of the non-linear activation function for the minimum input value in the range. This is achieved by clamping the alignment output.

Accordingly, the clamp unit 816 may be configured to clamp each received alignment output to a clamp range to generate a clamp output. The clamp range comprises a maximum value and a minimum value. Clamping the alignment output to a clamp range may comprise setting the clamp output to the maximum value of the clamp range if the alignment output is greater than the maximum value, setting the clamp output to the minimum value of the clamp range if the alignment output is less than the minimum value, and setting the clamp output to the alignment output otherwise. In some cases, the clamp range comprises the range of integers representable by an A+B bit unsigned integer where the index has A bits, and the interpolation value has B bits. For example, if the index and the interpolation value are both 9 bits then the clamp unit 816 may be configured to clamp the alignment output to an 18-bit unsigned integer which comprises integers in the range 0 to $2^{18}-1$.

In some cases, the clamp range of the clamp unit 816 may be configurable. In such cases, the clamp unit 816 may be configured to receive information identifying a clamp range and clamp the alignment outputs to the identified clamp range. In some cases, the clamp range may be based on the number of values stores in the LUT 802. For example, as described in more detail below with respect to FIG. 10, the LUT 802 may be able to store a first number of values or a second number of values representing the non-linear activation function. In such cases, when the first number of values are stored in the LUT 802, a first clamp range may be identified, and when the second number of values are stored in the LUT 802, a second clamp range may be identified. The first clamp range may be the range of integers representable by an M bit unsigned integer (i.e., 0 to $2^M-1$) and the second predetermined range may the range of integers representable by a N-bit unsigned integer (i.e., 0 to $2^N-1$)) where M and N are different integers. M and N may be selected based on the first and second number of values, respectively.

In some cases, the clamping performed by the clamp unit 816 may be selectively disabled. For example, in some cases the clamp unit 816 may be configured to receive a disable clamp flag and when the disable clamp flag is not set, the clamp unit 816 may be configured to clamp the received alignment output to the clamp range to generate the clamp output; and when the disable clamp flag is set, the clamp unit 816 may be configured to output a certain number of bits of the alignment output as the clamp output. Specifically, when the disable clamp flag is set, the clamp unit 816 may be configured to output a certain number of LSBs of the alignment output as the clamp output. The number of LSBs of the alignment output that are used to generate the clamp output may be based on the number of bits in the interpolation value and the index. For example, where the interpolation value has B bits and the index has A bits then then clamp unit 816 may be configured to output the A+B least significant bits of the alignment output as the clamp output. In some cases, the number of bits in the interpolation value may be fixed and the number of bits used for the index is based on the number of values stored in the LUT 802.

The split unit 818 may be configured to split or subdivide the clamp output into an index which is provided to the LUT interface unit 810, and an interpolation value which is provided to the interpolation unit 812. For example, the split unit 818 may be configured to output the B LSBs of the clamp output as the interpolation value and output the A MSBs of the clamp output as the index.

The LUT interface unit 810 is configured to obtain a plurality of values stored in the LUT 802 based on the index generated by the index generation unit 808. The number of values that are obtained from the LUT 802 is dependent on the interpolation technique implemented by the interpolation unit 812. Example interpolation techniques include, but are not limited to, linear interpolation and quadratic interpolation. If the interpolation unit 812 is configured to perform linear interpolation then the LUT interface unit 810 uses the index to obtain $y_0$ and $y_1$ where $x_0$ and $x_1$ represent the input values in the discrete set of input values associated with the values stored in the LUT 802 that are closest to the received input value. In contrast, if the interpolation unit 812 is configured to perform quadratic interpolation then the LUT interface unit 810 may be configured to obtain three values from the LUT 802.

The interpolation unit 812 is configured to generate an estimate of the output of the non-linear activation function for an input value by interpolating between the plurality of values of the LUT 802 obtained from the index using the interpolation value. As is known to those of skill in the art, interpolation is the process of predicting the value of a function based on known values of the function. The interpolation unit 812 may be configured to interpolate between the plurality of values using the interpolation value using any suitable interpolation technique. In some cases, the interpolation unit 812 may be able to selectively reverse the sign of the output in response to a reverse sign flag as described above with respect to FIG. 3 and may optionally be able to combine the interpolation output with a configurable output offset as described above with respect to FIG. 3.

Figure 10:
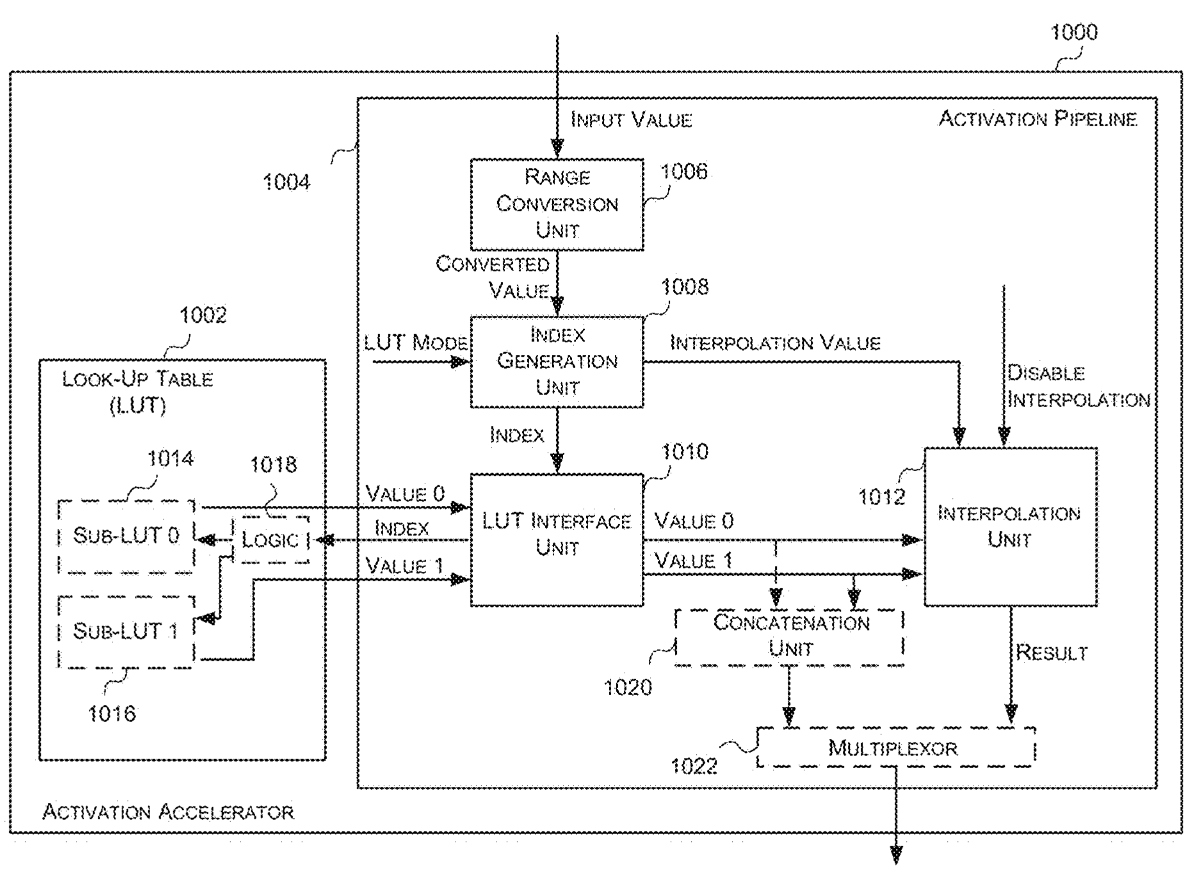
FIG. 10 is a block diagram of a third example activation accelerator.

Reference is now made to FIG. 10 which illustrates a third example activation accelerator 1000. The activation accelerator 1000 of FIG. 10 comprises a look-up table (LUT) that is configurable in one of a plurality of modes and an index generation unit that is configured to generate an index to the LUT based on the mode of the LUT.

The activation accelerator 1000 of FIG. 10 comprises a look-up table (LUT) 1002 and an activation pipeline 1004.

The LUT 1002, like the LUTs 302 and 802 of FIGS. 3 and 8, is configured to store values that represent a non-linear activation function to be applied to input values. In some cases, each value in the LUT 1002 is associated with a specific input value, and the output of the non-linear activation function for an input value can be determined from the associated value in the LUT 1002. In some cases, each value stored in the LUT 1002 may be equal to the output of the non-linear activation function for the associated input value. In other cases, each value stored in the LUT 1002 may be a value from which the output of the non-linear activation function for the associated input value can be determined.

The input values associated with the values of the LUT 1002 may be equally spaced input values within a predetermined range. The spacing between the input values associated with the values in the LUT 1002 may be based on, for example, the predetermined range and the number of values stored in the LUT 1002.

Each value stored in the LUT 1002 is associated with an index or address which can be used to identify or retrieve that value from the LUT 1002. The index for a value associated with a particular input value can be generated from the input value.

In some cases the LUT 1002 may be subdivided into sub-LUTs 1014, 1016 and the plurality of values stored in the LUT 1002 may be divided between the LUTs. This may be referred to herein as a double LUT. Dividing the plurality of values between the sub-LUTs 1014, 1016 may allow multiple values to be retrieved from the LUT 1002 in an efficient manner.

Figure 11:
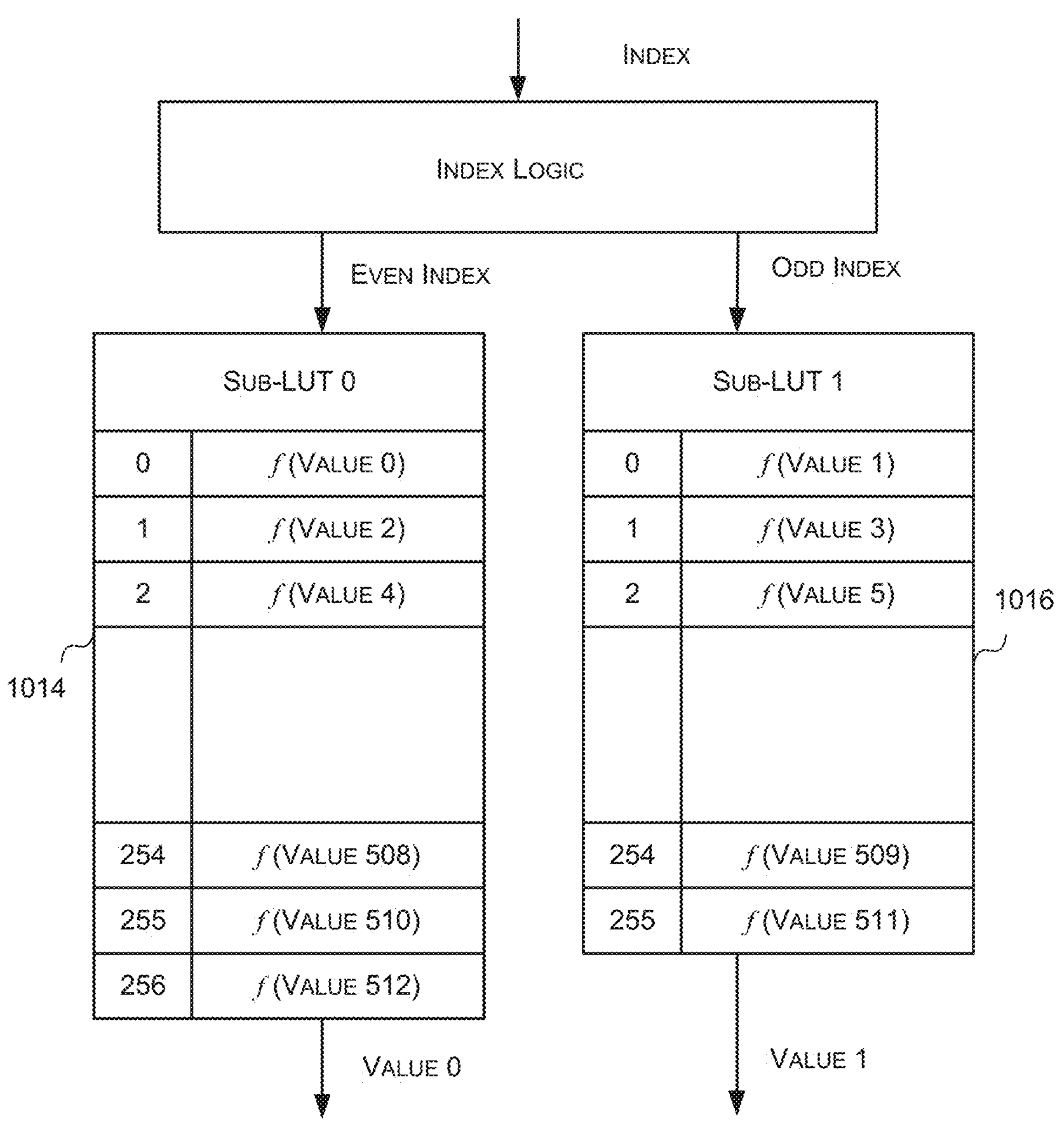
FIG. 11 is a schematic diagram illustrating values stored in a look-up table in accordance with a first example mode.

The LUT 1002 of FIG. 10 can be configured in one of a plurality of modes. The mode defines how the values are stored in the LUT 1002. The mode may define the number of values stored in the LUT 1002 and the bit-width of those values. In one example, the plurality of modes may comprise a first mode in which the LUT 1002 is configured to store a first number of values of a first bit-width in the LUT 1002. In some cases, when the LUT 1002 is configured in this mode the LUT 1002 may be configured to obtain two values from the LUT 1002 based on a received index for use in performing linear interpolation. Specifically, the LUT 1002 may be configured to obtain the value in the LUT 1002 value associated with the received index and the value in the LUT 1002 associated with the next index (e.g. received index+1). The first number of values and the first bit-width may be based on the size and configuration of the LUT 1002 and the number of index bits. In one example, the first number of values may be 513 and the first bit-width may be 16 such that in the first mode the LUT 1002 is configured to store 513 16-bit values. In this example, a 9-bit index can be used to uniquely identify a pair of values in the LUT. Specifically, a 9 bit value can be used to identify 512 different indices (0-511) and the LUT 1002 comprises an additional value so that when the index is 511, two values can be obtained from the LUT—i.e., the value that corresponds to index 511 and the value that corresponds to index 512.

Where the LUT 1002 is sub-divided into two sub-LUTs 1014, 1016 then, as shown in FIG. 11, one sub-LUT 1014 may be configured to store values associated with even indices and the other sub-LUT 1016 may be configured to store values associated with odd indices. This allows the two most relevant values in the LUT, with respect to an input value, for use in performing, for example, linear interpolation to be obtained in an efficient manner. As described above, the LUT 1002 may receive an index that identifies the most relevant value in the LUT and the LUT 1002 may obtain the value associated with that index and the value associated with the next highest index (i.e. received index+1). The received index and the next highest index will comprise one even index and one odd index. Thus, the two values will be in different sub-LUTs and can be obtained at the same time.

For example, the LUT 1002 may comprise index logic 1018 which is configured to receive the index generated by the index generation unit, and when the LUT 1002 is in the first mode, generate an index (i.e., an even index) for the first sub-LUT therefrom and an index (i.e., an odd index) for the second sub-LUT therefrom. For example, if the received index is even, then the index logic 1018 may be configured to (i) send all bits of the received index, except the LSB, to the first sub-LUT as an index, and (ii) add 1 to the received index to generate a second index, and send all bits of the second index, except the LSB, to the second sub-LUT as an index. If, however, the received index is odd then the index logic 1018 may be configured to (ii) send all bits of the received index, except the LSB, to the second sub-LUT as an index, and (ii) add 1 to the received index to generate a second index, and send all bits of the second index, except the LSB, to the first sub-LUT as an index. For example, if the received index is 10 (decimal) (000001010 (binary)) then the index logic 1018 may be configured to send an index of 5 (decimal) (00000101) (binary)) to the first sub-LUT to obtain the value that corresponds to the $10^{th}$ input value in the set associated with the values in the LUT 1002; generate a second index by adding 1 to the received index (so a second index of 11 (decimal) (000001011 (binary)) then send an index of 5 (decimal (00000101) binary)) to the second sub-LUT to obtain the value that corresponds to the $11^{th}$ input value in the set associated with the values in the LUT 1002.

In other cases, the index logic 1018 may form part of the LUT interface unit such that the index logic 1018 receives the index generated by the index generation unit and sends two indices to the LUT 1002 based thereon. In some cases, when the interpolation value will always be zero (e.g. when there is a left shift of the maximum left shift amount), the interpolation performed by the interpolation unit may be disabled (e.g. by setting a disable interpolation flag as described below) and/or the index logic 1018 may be configured to only read one value from the LUT 1002.

In some cases, the plurality of modes may comprise a second mode in which the LUT 1002 is configured to store a second number of values at the first bit-width where the second number of values is less than the first number of values. In some cases, the second number of values may differ from the first number of values by a power of 2. For example, the first number of values may be 513 and the second number of values may be 257. In this mode the values may be stored in the LUT 1002 in the same manner as the first mode and the LUT 1002 may be configured to obtain values from the LUT 1002 from the index in the same manner as the first mode. For example, the LUT 1002 may be configured to obtain, for a received index, the value in the LUT 1002 corresponding to that index and the value in the LUT 1002 corresponding to the next highest index; and where the LUT 1002 is formed of two sub-LUTs the values may be divided between the sub-LUTs (e.g. the values corresponding to even indices may be stored in one sub-LUT, and values corresponding to odd indices may be stored in the other sub-LUT). The only differences between the first mode and the second mode are that less values are stored in the LUT, and the index has a fewer number of bits (or fewer relevant bits). For example, when the first and second number of values are 513 and 257 respectively a 9-bit index may be used to identify pairs of values in the first mode and an 8-bit index may be used to identify pairs of values in the second mode.

Figure 12:
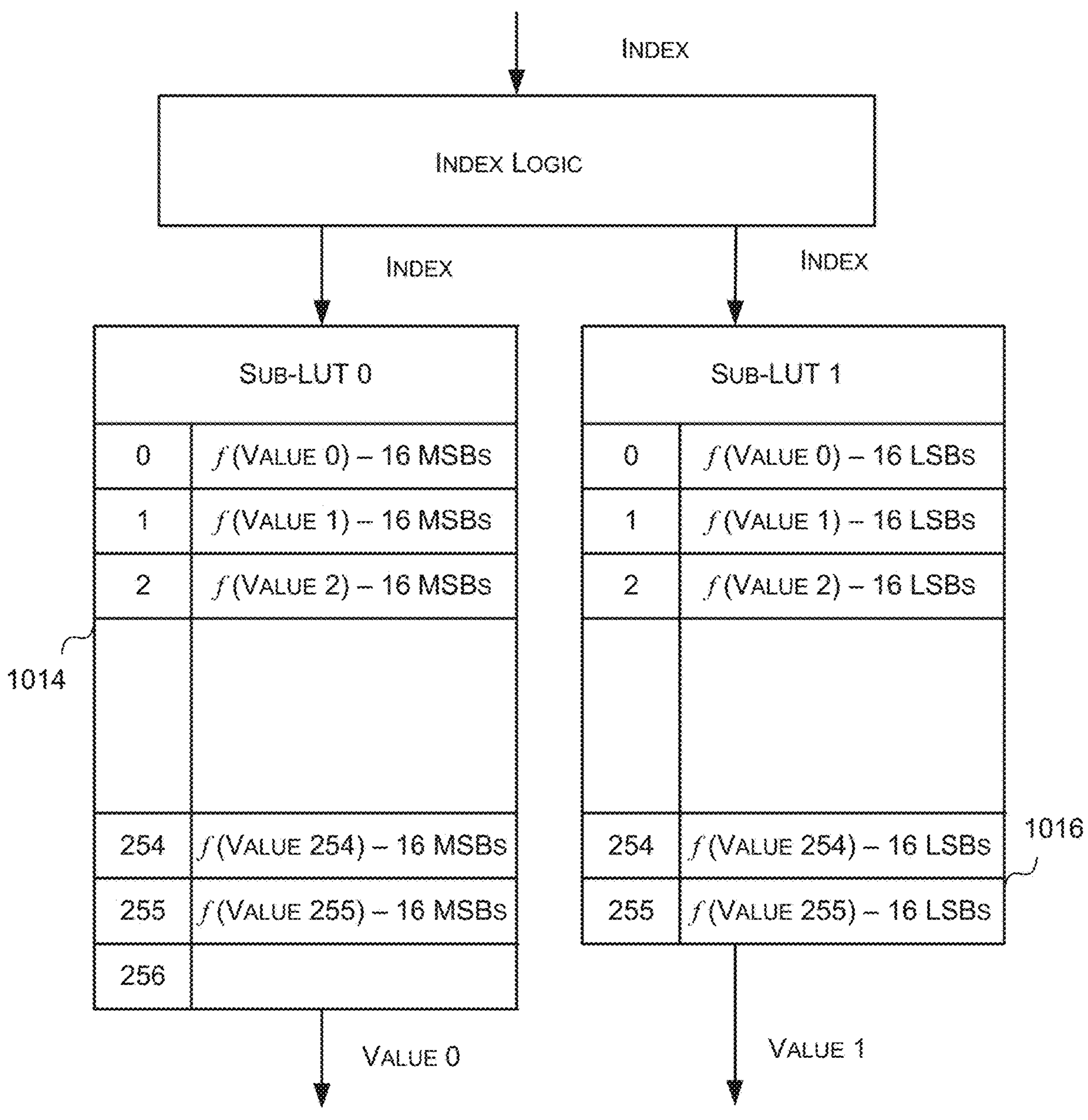
FIG. 12 is a schematic diagram illustrating values stored in a look-up table in accordance with a second example mode.

In some cases, the plurality of modes may comprise a third mode in which the LUT 1002 is configured to store a third number of values at a second bit-width. In some cases the second bit-width may be twice the first bit-width. For example, the first bit width may be 16 and the second bit width may be 32. In such cases, the LUT 1002 may be configured to sub-divide each value into a first sub-value comprising the MSBs and a second sub-value comprising the LSBs and store the sub-values in the LUT 1002 separately. For example, if the first bit with is 16 and the second bit width is 32, the first sub-value may comprise the 16 MSBs and the second sub-value may comprise the 16 LSBs. Thus to obtain a value that corresponds to an input value, two sub-values of the first bit-width are read from the LUT 1002—the sub-value corresponding to the MSBs and the sub-value corresponding to the LSBs.

Where the LUT 1002 is sub-divided into two sub-LUTs 1014, 1016 then, as shown in FIG. 12, one sub-LUT 1014 may be configured to store the MSBs and the other sub-LUT 1016 may be configured to store the LSBs. In such cases, the LUT 1002 may comprise index logic 1018 which is configured to receive an index, and when the LUT 1002 is configured in the third mode, the index logic 1018 may be configured to send the received index to both sub-LUTs which may return the MSBs and LSBs of the relevant value respectively (as values 0 and 1 respectively, for example). For example, if the index logic receives an index of 7 then the index logic may pass this index to both the first sub-LUT 1014 and the second sub-LUT 1016 which return the values associated with index 7 which will represent the MSBs and LSBs respectively.

When the LUT 1002 is configured in this manner then together the two values obtained by the LUT 1002 represent a value of the non-linear activation function for an input value. Accordingly, the activation accelerator 1000 may comprise a concatenation unit 1020 which is configured to concatenate the first and second values obtained from the LUT 1002 to generate a concatenated value of the second bit-width.

The LUT 1002 is programmable so that the activation accelerator 1000 can be configured to implement any number of non-linear activation functions. Accordingly, to apply a specific non-linear activation function to a set of input values the LUT 1002 is programmed or loaded with the values that represent that specific non-linear activation function.

In some cases, the LUT 1002 is sized such that it can store values for at least two non-linear activation functions at the same time. This allows the LUT 1002 to be programmed with values that represent a second non-linear activation function to be applied to a second set of input values while the LUT 1002 is being used to apply a first non-linear activation function to a first set of input values. Where the LUT 1002 is sized such that it can store values for multiple non-linear activation functions at the same time, the LUT 1002 may be sub-divided into sub-LUTs such that there is a pair of sub-LUTs per non-linear activation function. For example, if the LUT 1002 is sized such that it can store values for two non-linear activation functions at the same time, then the LUT 1002 may be divided into four sub-LUTs, where two sub-LUTs are used to store the values for the first non-linear activation function and another two sub-LUTs are used to store the values for the second non-linear activation function. This set-up would allow one pair of sub-LUTs to be used to apply the first non-linear activation function to input values while the second pair of sub-LUTs is being programmed.

Each activation pipeline 1004 is configured to receive input values and generate an estimate, for each input value, of the result of applying the non-linear activation function to that input value based on the values stored in the look-up table 1002. Each activation pipeline 1004 comprises a range conversion unit 1006, an index generation unit 1008, a LUT interface unit 1010 and an interpolation unit 1012. Each unit 1006, 1008, 1010, 1012 may be implemented in hardware.

The range conversion unit 1006 is configured to receive a plurality of input values and convert the received input values into converted values which are in a numerical range suitable for indexing the LUT 1002 (e.g. a positive integer range). The range conversion unit 1006 may be configured to generate the converted values from the input values in any suitable manner. For example, in some cases the range conversion unit 1006 may be configured to receive an input offset which can be combined with the input values to generate the converted values. In other cases, the range conversion unit may be configured, as described above with respect to FIG. 3, to receive both an input offset and absolute value flag and output the combination of the input value and the input offset when the absolute value is not set, and output the absolute value of the combination of the input value and the input offset when the absolute value flag is set so as to be able to implement functions that are symmetric with respect to the y, or output, axis or with respect to the origin more efficiently.

The index generation unit 1008 is configured to receive information identifying the mode of the LUT 1002 and generate an index and an interpolation value from each converted value based on the identified mode of the LUT 1002. The index is used to identify and retrieve a plurality (e.g. a pair) of values from the LUT 1002 which are relevant to the input value and the interpolation value is used to interpolate between the plurality of values retrieved from the LUT 1002. The index is generated from one or more bits of the converted value and the interpolation value may be based on one or more bits of the converted value or may be set to zero.

The index generation unit 1008 may be configured to generate the index and the interpolation value from the converted value, based on the mode of the LUT 1002, in any suitable manner. In some cases, the index generation unit 1008 is configured to generate an F-bit unsigned integer from the converted value and split the F-bit unsigned integer into an index and an interpolation value, wherein F is selected based on the mode. F may be selected based on the number of interpolation bits and the number of bits to index the LUT 1002. For example, F may be equal to A+B wherein A is the number of bits used to index the LUT 1002 and B is the number of bits of the interpolation value. In some cases the number of bits of the interpolation value may be fixed, but the number of bits to index the LUT 1002 may be variable and may depend on the mode of the LUT 1002, and specifically the number of values representing the non-linear activation function stored in the LUT 1002. Accordingly F may be set to one value when the mode indicates that a first number of values are stored in the LUT 1002 and F may be set to another value when the mode indicates a second number of values are stored in the LUT 1002. For example if the interpolation value is 9 bits, and in the first mode 513 values are stored in the LUT 1002 such that 9 bits can be used to index the LUT 1002, in the second mode 257 values are stored in the LUT 1002 such that 8 bits can be used to index the LUT 1002, and in the third mode 256 values are stored in the LUT 1002 such that 8 bits can be used to index the LUT 1002; then when the LUT 1002 is in the first mode, F may be set to 18; when the LUT 1002 is in the second mode, F may be set to 17; and when the LUT 1002 is in the third mode, F may be set to 17.

In some cases, the specific bits of the converted value which are used to generate the F-bit unsigned integer is fixed. For example, in some cases, where the index is an A bit value and the interpolation value is B bits the least significant A+B bits of the converted value may be used to generate the F-bit unsigned integer.

As described above, in such cases, the range conversion unit 1006 may be configured such that input values in the range of input values associated with the values in the LUT 1002 will be mapped to converted values in the A+B bit unsigned integer range, and input values that fall outside that input value range will be mapped to converted values outside the A+B bit unsigned integer range (i.e., they may be mapped to converted values that are less than or greater than the A+B bit unsigned integer range). If an input value falls outside the range of input values associated with the values in the LUT 1002, then there may not be a set of values in the LUT 1002 from which the result or output of the non-linear activation function for that input value can be accurately estimated. Therefore the output of the non-linear activation function for an input value that falls outside the range of input values associated with the LUT 1002 values may be estimated to be the output of the non-linear activation function for the closest input value in the range. Specifically, the output of a non-linear activation function for input values greater than the maximum input value in the range of input values associated with the LUT 1002 values may be estimated to be the output of the non-linear activation function for the maximum input value in that range of input values, and the output of a non-linear activation function for input values less than the minimum input value in the range of input values associated with the LUT 1002 values may be estimated to be the output of the non-linear activation function for the minimum input value in the range.

To implement this, the index generation unit 1008 may be configured to clamp the converted value to an F bit unsigned integer. As is known to those of skill in the art, clamping a value to an F bit unsigned integer comprises outputting 0 if the received value is less than 0, outputting the maximum value representable as an F bit unsigned integer if the received value is greater than the maximum value representable as an F bit unsigned integer (i.e. $2^F-1$), and outputting the received value otherwise. In such cases, the index generation unit 1008 may comprise a clamp unit (not shown) to perform the clamping.

In other cases, the specific bits of the converted value which are used to generate the F-bit unsigned integer (and thus the specific bits of the converted value which are used to generate the index and interpolation value) may be configurable. For example, in some cases, prior to clamping the converted value to an unsigned integer of F bits, the index generation unit 1008 may be able to shift the converted value left or right a configurable number of bits such that a different set of bits of the converted value are used to generate the F-bit unsigned integer. An index generation unit in which the specific bits of the converted value used to generate the index and the interpolation value is configurable was described above with respect to FIG. 8.

In some cases, the clamping performed by the index generation unit 1008 may be selectively disabled to allowed periodic non-linear activation functions to be accurately implemented over a wider range of input values. For example, as described above with respect to FIG. 3, the index generation unit 1008 may be configured to receive a disable clamp flag, or the like, that indicates whether clamping is to be disabled. When the disable clamp flag is not set then the index generation unit 1008 may be configured to clamp the received converted value (or a shifted version of the converted value), and when the disable clamp flag is set then the index generation unit 1008 may be configured to output the F LSBs of the converted value (or a shifted version of the converted value).

The LUT interface unit 1010 is configured to obtain a plurality of values stored in the LUT 1002 based on the index generated by the index generation unit 1008. The number of values that are obtained from the LUT 1002 are dependent on the interpolation technique implemented by the interpolation unit 1012. Example interpolation techniques include, but are not limited to, linear interpolation and quadratic interpolation. If the interpolation unit 1012 is configured to perform linear interpolation then the LUT interface unit 1010 uses the index to obtain $y_0$ and $y_1$ where $x_0$ and $x_1$ represent the input values in the discrete set of input values that correspond to the output values stored in the LUT 1002 that are closest to the received input value. In contrast, if the interpolation unit 1012 is configured to perform quadratic interpolation then the LUT interface unit 1010 may be configured to obtain three values from the LUT 1002. In some cases, the LUT interface unit 1010 may be configured to provide the index to the LUT 1002 and the LUT 1002 (e.g. index logic 1018 thereof) may be configured to obtain the relevant values from the LUT 1002 based on the index and the mode of the LUT 1002 as described above. In other cases, the index logic 1018 may form part of the LUT interface unit 1010.

The interpolation unit 1012 is configured to generate an estimate of the output of the non-linear activation function for an input value by interpolating, using the interpolation value, between the plurality of values of the LUT 1002 obtained from the index. As is known to those of skill in the art, interpolation is the process of predicting the value of a function based on known values of the function. The interpolation unit 1012 may be configured to use any suitable interpolation technique to interpolate between the plurality of values using the interpolation value. In some cases, the interpolation unit 1012 may be able to selectively reverse the sign of the output in response to a reverse sign flag as described above with respect to FIG. 3 and may optionally be able to combine the interpolation output with a configurable output offset as described above with respect to FIG. 3.

As described above, when the LUT 1002 is configured in the third mode together the two values obtained from the LUT 1002 represent an output of the non-linear activation function. Accordingly, when the LUT 1002 is configured in the third mode the interpolation may not be performed. Therefore, in some cases the interpolation unit 1012 may be configured to receive a disable interpolation flag and when the disable interpolation flag is not set the interpolation unit 1012 may be configured generate an estimate of the output of the non-linear activation function for an input value via interpolation, and when the disable interpolation flag is set the interpolation unit may be disabled (e.g. may not perform the interpolation).

Regardless of whether the interpolation unit can be selectively disabled, when the LUT 1002 supports the third mode described above, and the activation accelerator 1000 comprises a concatenation unit 1020 as described above to concatenate the values obtained from the LUT 1002, the activation accelerator 1000 may also comprise logic, such as, but not limited to, a multiplexor 1022, which is configured to receive the output of the concatenation unit 1020 and the output of the interpolation unit 1012 and selectively output one of the outputs based on the mode of the LUT 1002. For example, if the look-up table is configured in the third mode then the multiplexor 1022 may be configured to output the output of the concatenation unit 1020. In contrast, if the LUT 1002 is configured in another mode (e.g. the first mode or the second mode) then the multiplexor 1022 may be configured to output the output or result generated by the interpolation unit 1012.

Figure 13:
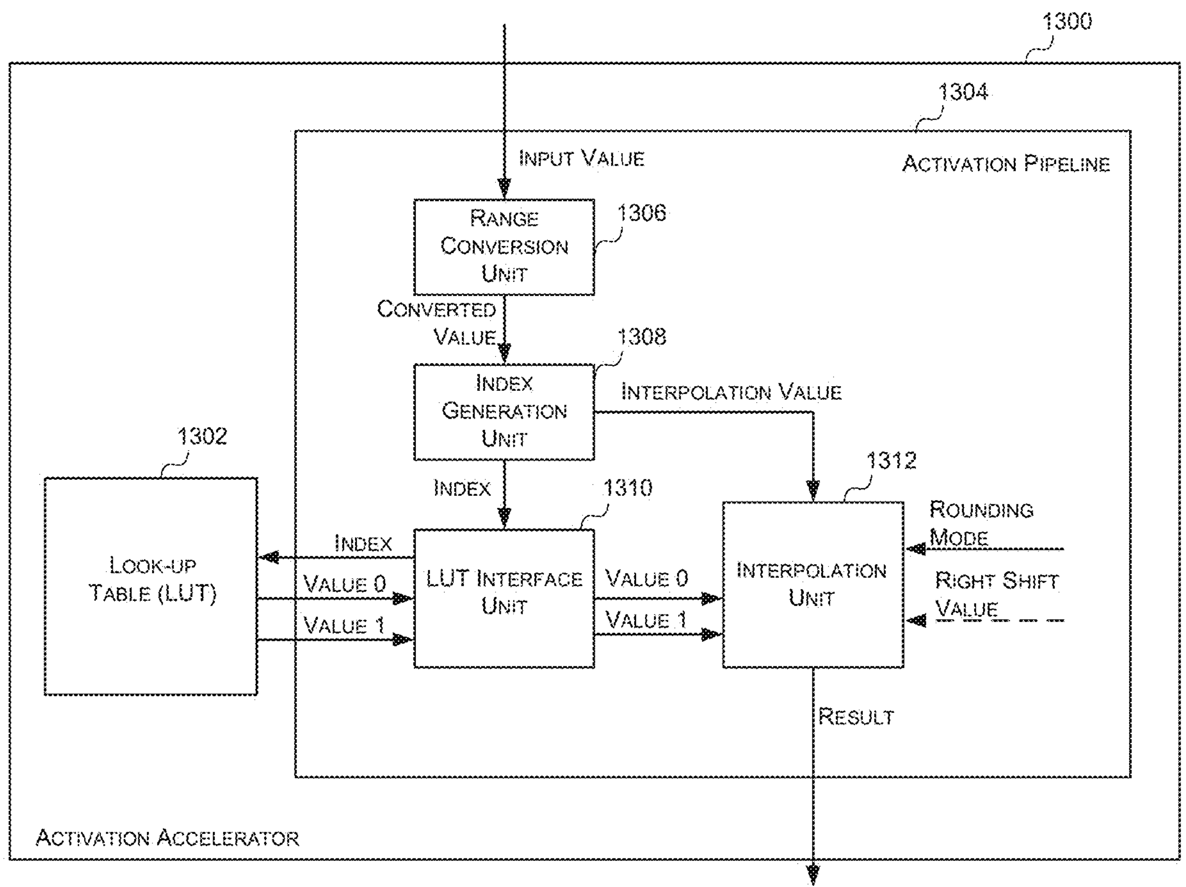
FIG. 13 is a block diagram of a fourth example activation accelerator.

Reference is now made to FIG. 13 which illustrates a fourth example activation accelerator 1300. The activation accelerator 1300 of FIG. 13 supports configurable rounding of the interpolation output generated by the interpolation unit.

The activation accelerator 1300 of FIG. 13 comprises a look-up table (LUT) 1302 and one or more activation pipelines 1304.

The LUT 1302, like the LUTs 302, 802 and 1002 of FIGS. 3, 8 and 10, is configured to store values that represent a non-linear activation function to be applied to input values. As described above, in some cases, each value in the LUT is associated with a specific input value, and the output of the non-linear activation function for an input value can be determined from the associated value(s). In some cases, each value stored in the LUT 1302 may be equal to the output of the non-linear activation function for the associated input value. In other cases, each value stored in the LUT 1302 may be a value from which the output of the non-linear activation function for the associated input value can be determined.

The input values associated with the values in the LUT 1302 may be equally spaced input values within an input value range. The spacing between the input values associated with the values in the LUT 1302 may be based on, for example, the range and the number of values stored in the LUT 1302.

Each value stored in the LUT 1302 is associated with an index or address which can be used to identify that value in the LUT 1302 and/or retrieve that value from the LUT 1302. The index for a value associated with a particular input value can be generated from the input value.

The values may be stored in any suitable manner in the LUT 1302. For example, as described above with respect to FIG. 10, in some cases, the LUT 1302 may be subdivided into two sub-LUTs wherein one sub-LUT stores the values that correspond to even indices and another sub-LUT stores the values that corresponds to odd indices. However, this is an example only. In some cases, as described above with respect to FIG. 10, the LUT 1302 may support multiple different modes in which in each mode the values representing a non-linear activation function are stored in a different manner in the LUT 1302. For example, in one mode the LUT 1302 may be configured to store a first number of values with a first bit-width and in another mode the LUT 1302 may be configured to store a second number of values with a second bit-width.

The LUT 1302 is programmable so that the activation accelerator 1300 can be configured to implement any number of non-linear activation functions. Accordingly, to apply a specific non-linear activation function to a set of input values the LUT 1302 is programmed or loaded with the values that represent that specific non-linear activation function.

Each activation pipeline 1304 is configured to receive input values and generate, for each input value, an estimate of the output of the non-linear activation function for that input value based on the values stored in the look-up table 1302. Specifically, each activation pipeline 1304 is configured to (i) generate, for each input value, an index which is used to identify values in the LUT 1302 relevant to that input value; and (ii) generate an estimate of the non-linear activation function for that input value from the identified values. Each activation pipeline 1304 comprises a range conversion unit 1306, an index generation unit 1308, a LUT interface unit 1310 and an interpolation unit 1312. Each unit 1306, 1308, 1310, 1312 may be implemented in hardware.

The range conversion unit 1306 is configured to receive a plurality of input values and convert the received input values into converted values which are in a numerical range suitable for indexing the LUT 1302 (e.g. a positive integer range). The range conversion unit 1306 may be configured to generate the converted values from the input values in any suitable manner. For example, in some cases the range conversion unit 1306 may be configured to receive a configurable input offset which can be combined with the input values to generate the converted values. In other cases, the range conversion unit 1306 may be configured, as described above with respect to FIG. 3, to receive both a configurable input offset and absolute value flag and output the combination of the input value and the input offset when the absolute value is not set, and output the absolute value of the combination of the input value and the input offset when the absolute value flag is set so as to be able to implement non-linear activation functions that are symmetric with respect to the y, or output, axis and/or non-linear activation functions that are symmetric with respect to the origin more efficiently.

The index generation unit 1308 is configured to generate an index and an interpolation value from each converted value generated by the range conversion unit 1306. The index is used to identify and retrieve a plurality of values from the LUT 1302 which are relevant to the input value, and the interpolation value is used to interpolate between the plurality of values retrieved from the LUT 1302. The index is generated from one or more bits of the converted value and the interpolation value may be generated from one or more bits of the converted value or may be set to zero.

The index generation unit 1308 may be configured to generate an index and an interpolation value from each converted value in any suitable manner.

In some cases, the specific bits of the converted value which are used to generate the index and the interpolation value may be fixed. For example, in some cases, where the index is A bits and the interpolation value is B bits, the least significant A+B bits of the converted value may be used to generate the index and the interpolation value. Specifically, the B least significant bits (LSBs) of the converted value may be used to generate the interpolation value and the next A LSBs of the converted value may be used to generate the index.

In such cases, the range conversion unit 1306 may be configured such that input values in the range of input values associated with the values in the LUT 1302 will be mapped to converted values in the A+B bit unsigned integer range, and input values that fall outside that input value range will be mapped to converted values outside the A+B bit unsigned integer range (i.e., they may mapped to converted values that are less than or greater than the A+B bit unsigned integer range). If an input value falls outside the range of input values associated with the values in the LUT 1302, then there may not be a set of values in the LUT 1302 from which the result or output of the non-linear activation function for that input value can be accurately estimated. Therefore the output of the non-linear activation function for an input value that falls outside the range of input values associated with the LUT 1302 values may be estimated to be the output of the non-linear activation function for the closest input value in the range. Specifically, the output of a non-linear activation function for input values greater than the maximum input value in the range of input values associated with the LUT 1302 values may be estimated to be the output of the non-linear activation function for the maximum input value in that range of input values, and the output of a non-linear activation function for input values less than the minimum input value in the range of input values associated with the LUT 1302 values may be estimated to be the output of the non-linear activation function for the minimum input value in the range.

To implement this, the index generation unit 1308 may be configured to clamp the converted value to an A+B bit unsigned integer and output the B LSBs of the clamped value as the interpolation value and output the A most significant bits (MSBs) of the clamped value as the index. In such cases, the index generation unit 1308 may comprise a clamp unit (not shown) to perform the clamping and a split unit (not shown) configured to split the output of the clamp unit into the index and the interpolation value.

In other cases, the specific bits of the converted value which are used to generate the index and/or the interpolation value may be configurable. For example, in some cases, prior to clamping the converted value to an unsigned integer of A+B bits, the index generation unit 1308 may be able to shift the converted value left or right a configurable number of bits such that a different set of bits of the converted value are used to generate the index and/or the interpolation value. An index generation unit in which the specific bits of the converted value that are used to generate the index and the interpolation value is configurable was described above with respect to FIG. 8.

In some cases, the clamping performed by the index generation unit 1308 may be selectively disabled. In such cases the index generation unit 1308 may be configured to receive a disable clamp flag, or the like, that indicates whether clamping is to be disabled. When the disable clamp flag is not set then the index generation unit 1308 may be configured to clamp the received converted value (or a shifted version of the converted value), and when the disable clamp flag is set then the index generation unit 1308 may be configured to output the A+B LSBs of the converted value (or shifted version of the converted value).

The LUT interface unit 1310 is configured to obtain a plurality of values stored in the LUT 1302 based on the index generated by the index generation unit 1308. The number of values that are obtained from the LUT 1302 is dependent on the interpolation technique implemented by the interpolation unit 1312. Example interpolation techniques include, but are not limited to, linear interpolation and quadratic interpolation. If the interpolation unit 1312 is configured to perform linear interpolation then the LUT interface unit 1310 may be configured to use the index to obtain $y_0$ and $y_1$ where $x_0$ and $x_1$ represent the input values in the discrete set of input values that correspond to the values stored in the LUT 1302 that are closest to the received input value. In contrast, if the interpolation unit 1312 is configured to perform quadratic interpolation then the LUT interface unit 1310 may be configured to obtain three values from the LUT 1302.

The interpolation unit 1312 is configured to generate an estimate of the output or result of the non-linear activation function for an input value from an interpolation output. The interpolation unit 1312 is configured to generate the interpolation output by interpolating between the plurality of values retrieved from the LUT 1302 using the interpolation value. As is known to those of skill in the art, interpolation is the process of predicting the value of a function based on known values of the function. The interpolation unit 1312 may be configured to use any suitable interpolation technique to interpolate between the plurality of values retrieved from the LUT 1302 using the interpolation value.

The interpolation unit 1312 is configured to generate an interpolation output that has been rounded in accordance with a rounding mode, wherein the rounding mode is configurable. Specifically, the interpolation unit 1312 is configured to receive information identifying a rounding mode of a plurality of rounding modes and generate an interpolation output that has been rounded in accordance with the identified rounding mode. As is known to those of skill in the art, rounding is the process of replacing a value with a less exact or less precise number. A rounding mode defines a set of rules which are used to select the less exact or less precise number to replace a value. A value is rounded in accordance with a rounding mode if it is rounded in accordance with the set of rules associated with that rounding mode. In one example, the plurality of rounding modes may comprise round towards negative infinity (RTN) and round to nearest toward positive infinity (RNP). In the RTN mode a number is replaced with the next lowest value in a set of values. In the RNP mode a number is replaced with the closest value in a set of values, and if there is a tie, the number is replaced with the next highest value in the set. However, this is an example only and the activation accelerator 1300 may support other rounding modes. Supporting multiple rounding modes allows the activation accelerator 1300 to be more flexible and support a more varied set of non-linear activation functions. It also allows the activation accelerator 1300 to match reference framework implementations, such as TensorFlow Lite implementations, that use specific rounding modes.

In some cases, the interpolation unit 1312 may be configured to generate an interpolation output, interpout, that is rounded in accordance with an identified mode by generating a first partial interpolation output, p1, based on the multiple values retrieved from the look-up table and the interpolation value, adding a rounding constant, RC, to the first partial output to generate a second partial interpolation output, and right shifting the second partial interpolation output by a rightshiftamount (i.e. a number of bits) as shown in equation (2), wherein the rounding constant, RC, is selected based on the identified rounding mode. As is known to those of skill in the art, the right shift divides the second partial output (p1+RC) by $2^{rightshiftamount}$.

$$\text{interpout}=(p1+\text{RC})>>\text{rightshiftamount} \quad (2)$$

In this example, the RTN rounding mode may be implemented by setting the rounding constant to 0 and setting the rightshiftamount to the number of bits of the interpolation value, interpbits. In other words, setting the rounding constant to zero and right shifting by the number of bits of the interpolation value the causes the interpolation output to be rounded to the closest integer that is lower than the interpolation output. In this example the RNP rounding mode may be implemented by setting the rounding constant to $2^{(interpbits-1)}$ and setting the right shift amount to interpbits. This effectively adds 0.5 to the interpolation output and then rounds the interpolation output down (i.e., towards negative infinity). Accordingly, setting the rounding constant to $2^{(interpbits-1)}$ and right shifting by interpbits causes the interpolation output to be rounded to the closest integer to the interpolation output, and if there is a tie rounding towards positive infinity.

In some cases, where the interpolation unit 1312 is configured to implement linear interpolation, the interpolation unit 1312 may be configured to generate the first partial interpolation output, p1, in accordance with equation (3) where $y_0$ is a first value obtained from the LUT 1302, $y_1$ is a second value obtained from the LUT 1302, interp is the interpolation value, and interpbits is the number of bits of the interpolation value.

$$p1 = y_0 * 2^{interpbits} + (y_1 - y_0) * interp \quad (3)$$

In some cases, the interpolation unit may be configured to generate $y_0+2^{interpbits}$ by left shifting $y_0$ by interpbits since shifting is an efficient method of performing multiplication by powers of 2 in hardware.

In some cases the right shift amount (rightshiftamount) may be configurable. For example, in some cases the interpolation unit may be configured to receive information identifying the amount of the right shift (i.e. the number of bits to right shift) and shift the second partial interpolation output by the identified shift amount. As described above, using a right shift amount equal to interpbits will result in a rounded integer. Having a configurable right shift amount allows more or less divisions by two to be applied to the interpolation output. This may be used to reduce or increase the range of the output. In some cases, the configurable right shift amount may be used to match the output range to the output range of a specific implementation of a non-linear activation function such as a TensorFlow-Lite implementation of a non-linear activation function.

In some cases, the interpolation unit 1312 may be able to selectively reverse the sign of the result via a reverse sign flag and a negative flag as described above with respect to FIG. 3. In some cases, the interpolation unit 1312 may also be able to generate the result by combining the interpolation output with a configurable output offset as described above with respect to FIG. 3. In some cases the interpolation unit 1312 may be selectively disabled. For example, as described above with respect to FIGS. 3 and 8, the interpolation unit 1312 may be configured to receive a disable interpolation flag, and when the disable interpolation flag is set the interpolation unit 1312 may be disabled.

Figure 14:
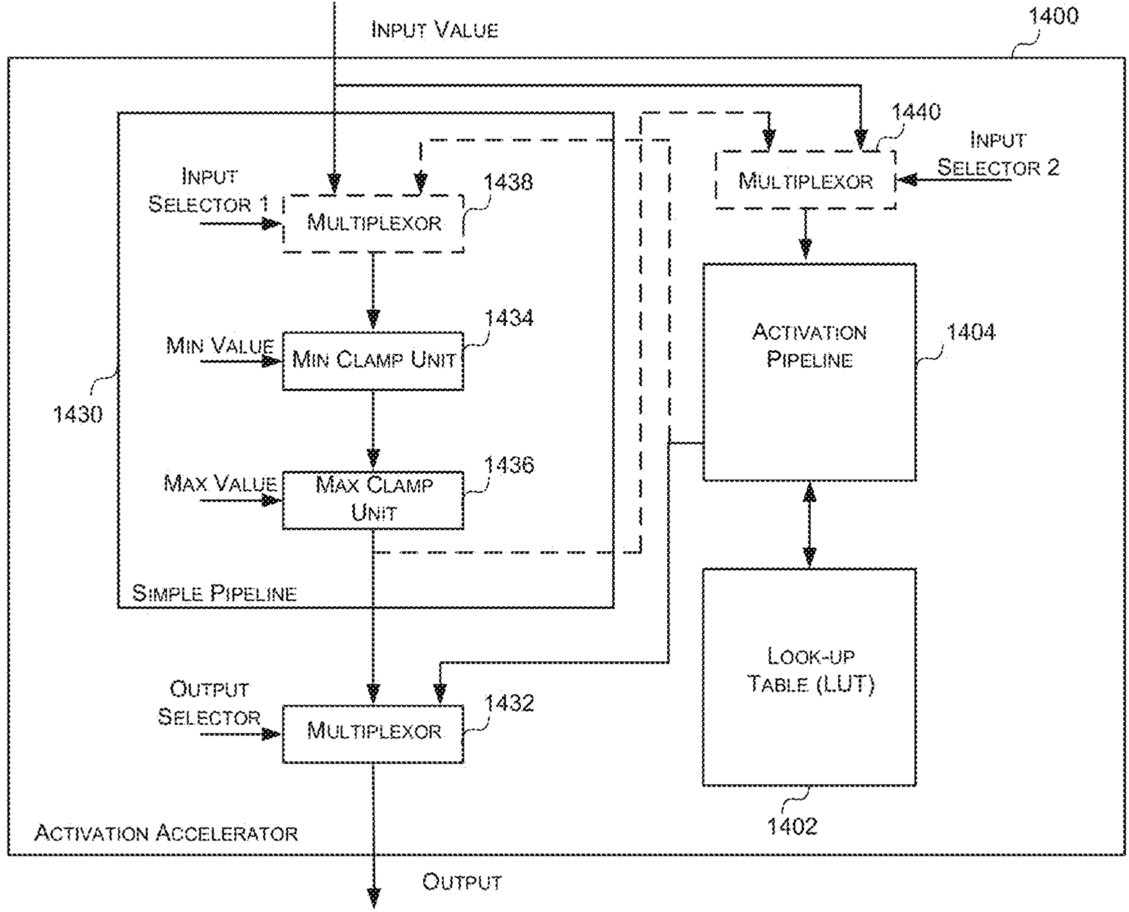
FIG. 14 is a block diagram of a fifth example activation accelerator.

Reference is now made to FIG. 14 which illustrates a fifth example activation accelerator 1400. The activation accelerator 1400 of FIG. 14, like the activation accelerators 300, 800, 1000, 1300 of FIGS. 3, 8, 10 and 13, comprises a look-up table 1402 and one or more activation pipelines 1404, which may be referred to as the complex activation pipelines or the main activation pipelines. The look-up table 1402 may be implemented as any of the look-up tables 302, 802, 1002 and 1302 described above and the one or more activation pipelines 1404 may be implemented as any of the activation pipelines 304, 804, 1004, 1304 described above. The activation accelerator 1400 of FIG. 14 also comprises a simple pipeline 1430 for each activation pipeline 1404 and logic, such as a multiplexor 1432, which is configured to selectively output either the output of the simple pipeline 1430 or the output of the activation pipeline 1404. The simple pipeline is configured to receive an input value and clamp the input value to a clamp range defined by a configurable minimum value and a configurable maximum value. The simple pipeline may be used to implement simple non-linear activation functions such as, but not limited to, a ReLU function more efficiently than the main activation pipeline.

The simple pipeline 1430 may be implemented in any suitable manner. In one example shown in FIG. 14, the simple pipeline 1430 may comprise a min clamp unit 1434 which is configured to receive a minimum value and an input value, and output the maximum of the minimum value and the received input value; and a max clamp unit 1436 which is configured to receive a maximum value and an input value, and output the minimum of the input value and the maximum value.

In some cases, the input value to the min clamp unit 1434 may be the main input value to the activation accelerator 1400. However, in some cases the simple pipeline 1430 may comprise logic, such as, but not limited to, a multiplexor 1438 which is configured to receive the main input value to the activation accelerator 1400 and the output of the activation pipeline 1404 and selectively provide one of the main input value and the output of the activation pipeline 1404 to the clamp units 1434, 1436 for processing. This allows the simple pipeline to perform clamping on either the main input value or on the output of the activation pipeline 1404. This may allow an arbitrary non-linear activation function and a ReLU activation function to be successively applied to a set of input data.

In some cases, the activation accelerator 1400 may also include logic, such as, but not limited to, a multiplexor 1440 which is configured to receive the main input value to the activation accelerator 1400 and the output of the simple pipeline 1430 and selectively provide one of the main input value and the output of the simple pipeline 1430 to the activation pipeline 1404. This allows clamping to be performed on the input value prior to providing the input value to the activation pipeline 1404. This may allow a ReLU activation function and an arbitrary non-linear activation function to be successively applied to a set of input data.

The activation accelerators described above are examples only and other activation accelerators may be generated that combine features of the described activation accelerators. For example, an activation accelerator may have any of the range conversion units 306, 806, 1006, 1306 in combination with any of the index generation units 308, 808, 1008, 1308 in combination with any of the interpolation units 312, 812, 1012, 1312 in combination with any of the LUTs 302, 802, 1002, 1302.

Figure 15:
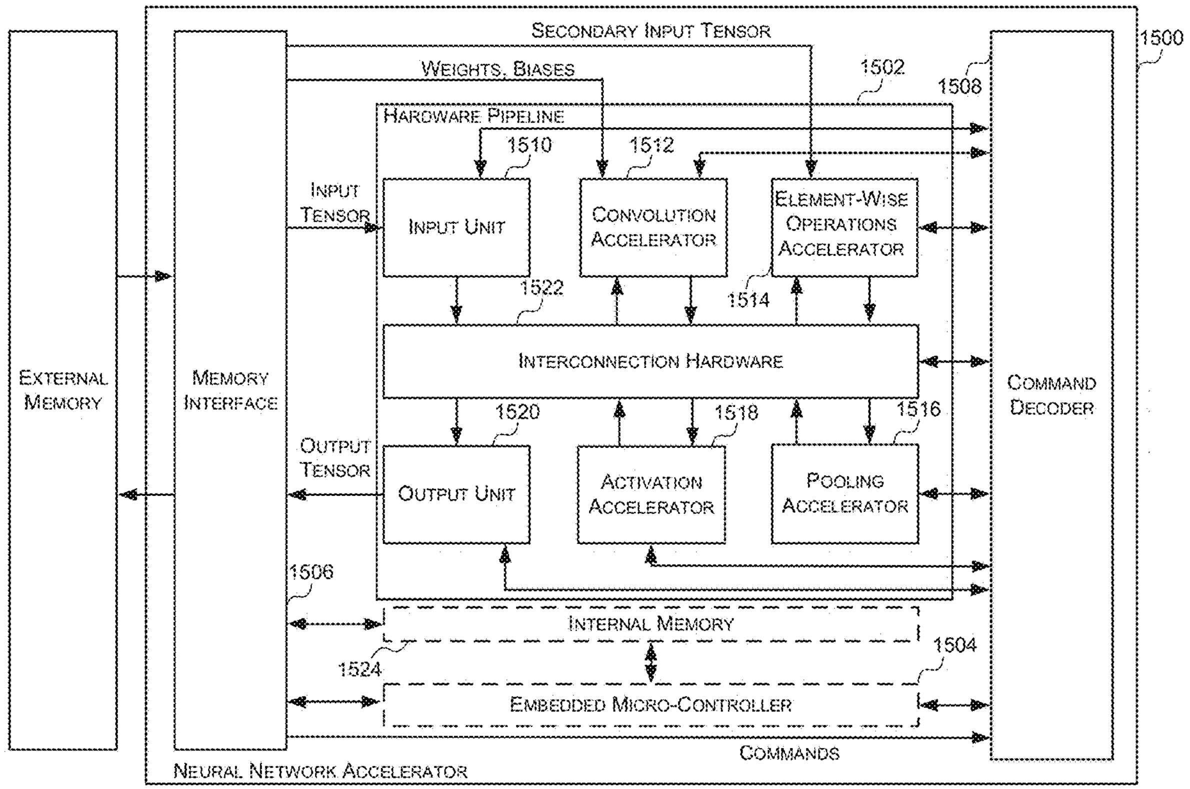
FIG. 15 is a block diagram of an example neural network accelerator with an activation accelerator and a convolution accelerator.

Reference is now made to FIG. 15 which illustrates an example neural network accelerator 1500 in which the activation accelerators described above may be implemented.

The neural network accelerator 1500 comprises a hardware pipeline 1502, a memory interface 1506 and a command decoder 1508.

The hardware pipeline 1502 comprises an input unit 1510, a plurality of hardware accelerators 1512, 1514, 1516, 1518, an output unit 1520 and interconnection hardware 1522. The hardware pipeline 1502 is configured to receive input data (an input tensor), process the input data (input tensor) using one or more of the hardware accelerators 1512, 1514, 1516, 1518 to generate output data (an output tensor), and output the output data (output tensor). The input data (input tensor) may represent all or a portion of the input data to a layer of a neural network. The receiving of input data at the hardware pipeline 1502 and processing it using one or more hardware accelerators is referred to as a hardware pass of the hardware pipeline. It may take one or more hardware passes of the hardware pipeline to implement a neural network. For example, in a first hardware pass input data may be input to the hardware pipeline 1502 for processing in accordance with a convolution layer by the convolution accelerator 1512, and then the output of the first hardware pass may be input to the hardware pipeline 1502 in a second hardware pass and processed in accordance with a pooling layer by the pooling accelerator 1516. A neural network may be mapped to hardware passes of the hardware pipeline 1502 in any suitable manner.

The input unit 1510 is hardware configured to receive and store the input data to the hardware pipeline 1502. The input data may be received from external memory (i.e., memory external to the NNA 1500) via the memory interface 1506. In some examples, the input unit 1510 may comprise one or more buffers to store the received input data. Although the example hardware pipeline 1502 of FIG. 15 comprises a single input unit 1510, other example hardware pipelines may comprise multiple input units. The term "input data to the hardware pipeline" is used herein to mean the input data to be processed by one or more hardware accelerators (which may or may not be equivalent to the input data to a layer of a neural network) and may be distinguished from other parameters used in a neural network such as weights, biases, etc. In some cases, the other input parameters may be input to the hardware pipeline in another manner (e.g. loaded into an internal or external storage unit associated with a specific accelerator). For example, the weights and biases for a convolution layer may be loaded into a buffer linked to, or forming part of, the convolution accelerator 1512.

Each accelerator 1512, 1514, 1516, 1518, is designed to accelerate one or more neural network operations. Specifically, each accelerator 1512, 1514, 1516, 1518 is configured to receive an input tensor and perform, via hardware logic, one or more operations on the input tensor to generate an output tensor. The hardware pipeline 1502 of FIG. 15 comprises a convolution accelerator 1512, an element-wise operations accelerator 1514, a pooling accelerator 1516 and an activation accelerator 1518. However, this is just an example set of accelerators and that other hardware pipelines may have additional accelerators, fewer accelerators and/or different accelerators depending, for example, on the type of neural networks they are intended to process. In some cases, one or more of the accelerators of FIG. 15 may be combined.

The convolution accelerator 1512 is hardware configured to accelerate convolution operations. An example implementation of a convolution accelerator 1512 is described with respect to FIGS. 16 and 17.

The element-wise operations accelerator 1514 is hardware configured to receive input data (e.g. an input tensor) and perform an element-wise operation on the input data (e.g. input tensor), optionally with another data set (e.g. another tensor which may be referred to as the secondary input tensor) which may be obtained or retrieved from external memory (e.g. memory external to the NNA) via the memory interface. An element-wise operation is a same operation that is performed on each element of the input data/tensor (e.g. each input data value or each tensel). Element-wise operations which may be performed on the input data include, but are not limited to, add, multiply, maximum, and minimum.

The other data set/tensor may be the same size (e.g. have the same dimensions) as the input data/tensor such that corresponding elements of the two tensors are combined using an element-wise operation. Alternatively, the other data set/tensor and the input data/tensor may have a different size or dimensions. If, for example, the mismatching dimension of one of the tensors is of size 1, an element-wise operation may be performed between the input data/tensor and the other data set/tensor using a broadcast technique wherein the smaller tensor is broadcast (or expanded) to the size of the other tensor. For example, a tensor of size [N, H, W, C]=[1, 10, 1, 10] can be combined element-wise with a tensor of size [N, H, W, C]=[1, 10, 10, 10] by expanding the W dimension of the first tensor.

The pooling accelerator 1516 is hardware configured to accelerate pooling operations such as, but not limited to, max, min and average.

The activation accelerator 1518 is hardware configured to accelerate non-linear operations such as, but not limited to, ReLU and LReLU. The activation accelerator 1518 may take the form of any of the activation accelerators described herein (e.g. activation accelerators 300, 800, 1000, 1300, 1400 of FIGS. 3, 8, 10, 13 and 14 or any combination thereof).

The output unit 1520 is hardware configured to receive the output tensor generated by processing the input data via one or more accelerators 1512, 1514, 1516, 1518. In some cases, the output unit 1520 may have a buffer or other storage for temporarily storing all or a portion the output tensor prior to outputting the output tensor from the hardware pipeline. In some cases, the output unit 1520 may be configured to save the output tensor in external memory (i.e., memory that is external to the neural network accelerator) via the memory interface 1506.

The interconnection hardware 1522 statically or dynamically connects the input unit 1510, one or more accelerators 1512, 1514, 1516, 1518 and the output unit 1520 to allow input data to the neural network accelerator to flow through (e.g. be processed by) one or more accelerators 1512, 1514, 1516, 1518 and then be output from the hardware pipeline 1502. In some cases, the interconnection hardware 1522 may comprise fixed hardware connections between the input unit 1510, the accelerators 1512, 1514, 1516, 1518 and the output unit 1520 that allow data to flow through the input unit 1510, the accelerators 1512, 1514, 1516, 1518 and the output unit 1520 in a limited number of ways. However, in other cases, the interconnection hardware 1522 may comprises hardware that can dynamically connect the input unit 1510, the accelerators 1512, 1514, 1516, 1518 and the output unit 1520 in a plurality of different ways in response to one or more control signals. For example, the interconnection hardware 1522 may comprise a crossbar and the input unit 1510, the accelerators 1512, 1514, 1516, 1518 and the output unit 1520 may be connected to the crossbar in such a manner that the crossbar can dynamically connect the input unit 1510, the accelerators 1512, 1514, 1516, 1518 and the output unit 1520 in a plurality of different ways in response to one or more control signals.

For example, in one hardware pass of the hardware pipeline 1502 the crossbar may connect the output of the input unit 1510 to the input of the convolution accelerator 1512, connect the output of the convolution accelerator 1512 to the input of the element-wise operations accelerator 1514, and then connect the output of the element-wise operations accelerator 1514 to the input of the output unit 1520 so that the input data for the hardware pass is processed by the convolution accelerator 1512 then the element-wise operations accelerator 1514. In another hardware pass, the crossbar may connect the output of the input unit 1510 to the input of the convolution accelerator 1512, and the output of the convolution accelerator 1512 to the input of the output unit 1520 so that the input data for the hardware pass is processed only by the convolution accelerator 1512. Accordingly, in these cases the connections between the input unit 1510, the accelerators 1512, 1514, 1516, 1518 and the output unit 1520 (and thus the manner in which data may flow through the input unit 1510, the accelerators 1512, 1514, 1516, 1518 and the output unit 1520) are not fixed or static.

In some cases, the NNA may also include an embedded micro-controller. The embedded micro-controller 1504 can execute instructions of a program to perform operations on data input to the embedded micro-controller 1504. The embedded micro-controller 1504 may be able to receive data from external memory via the memory interface 1506 or from internal memory 1524 that the embedded micro-controller has access to. The output unit 1520 may be able to send data to the embedded micro-controller 1504 via the internal memory 1524.

The command decoder 1508 controls the operation of the other components of the NNA 1500. Specifically the command decoder receives a set of commands indicating which data is to be input to the NNA and which components are to process the NNA and how, and then sends command or control information to the appropriate components so that the input data will be processed using the desired components in the desired manner. For example, the command decoder 1508 may, for each hardware pass of the hardware pipeline 1502, (i) send command or control information to the interconnection hardware 1522 indicating which accelerators are to be active or used in the hardware pass which causes the interconnection hardware 1522 to connect the input unit 1510, the accelerators 1512, 1514, 1516, 1518 and the output unit 1520 in the desired manner, and (ii) send information to each active accelerator indicating that it is to be active in the hardware pass and how it should be configured in that hardware pass which causes the accelerator to perform a desired operation on the data input to that accelerator. The command or control information may also indicate other information such as the formats of the input and data of the active accelerators. Where the embedded micro-controller 1504 is to be used to process data the command decoder 1508 may be configured to cause the micro-controller to execute a program of a plurality of programs.

Figure 16:
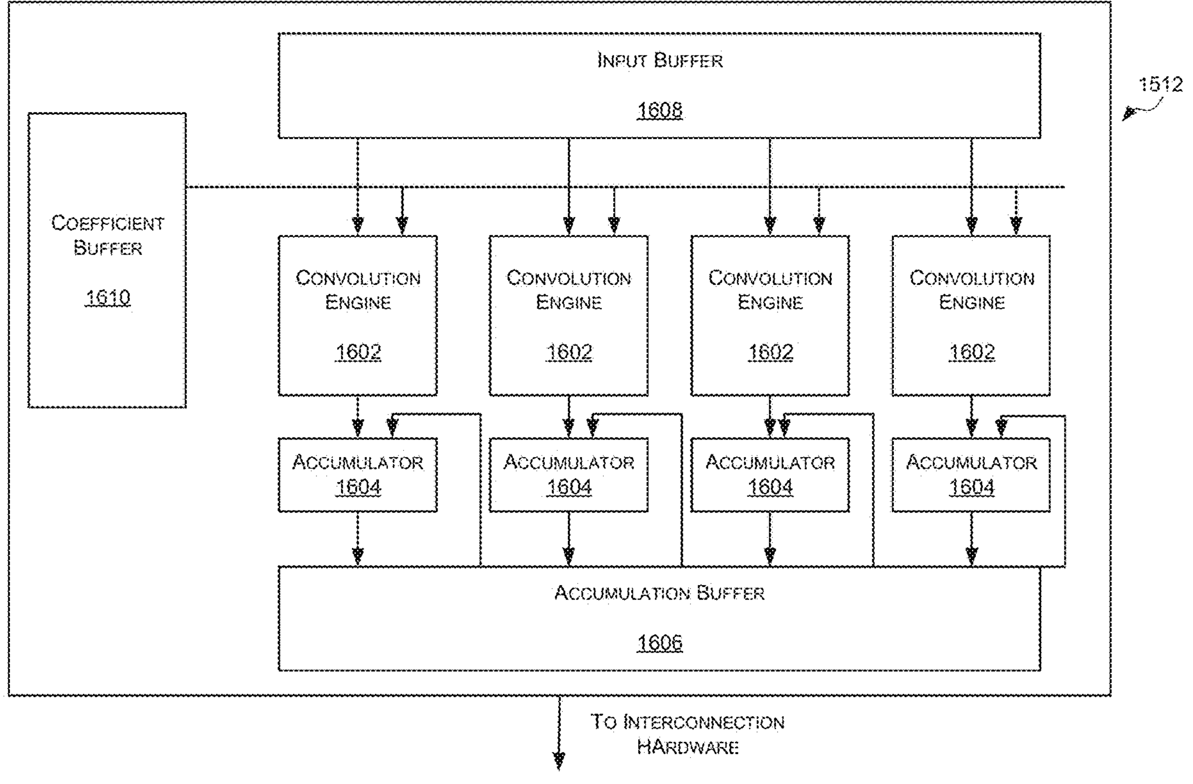
FIG. 16 is a block diagram of an example implementation of the convolution accelerator of FIG. 15 comprising a convolution engine.

Reference is now made to FIG. 16 which illustrates an example implementation of the convolution accelerator 1512 of FIG. 15. In this example, the convolution accelerator 1512 comprises a plurality of convolution engines 1602, a plurality of accumulators 1604 and an accumulation buffer 1606.

Figure 17:
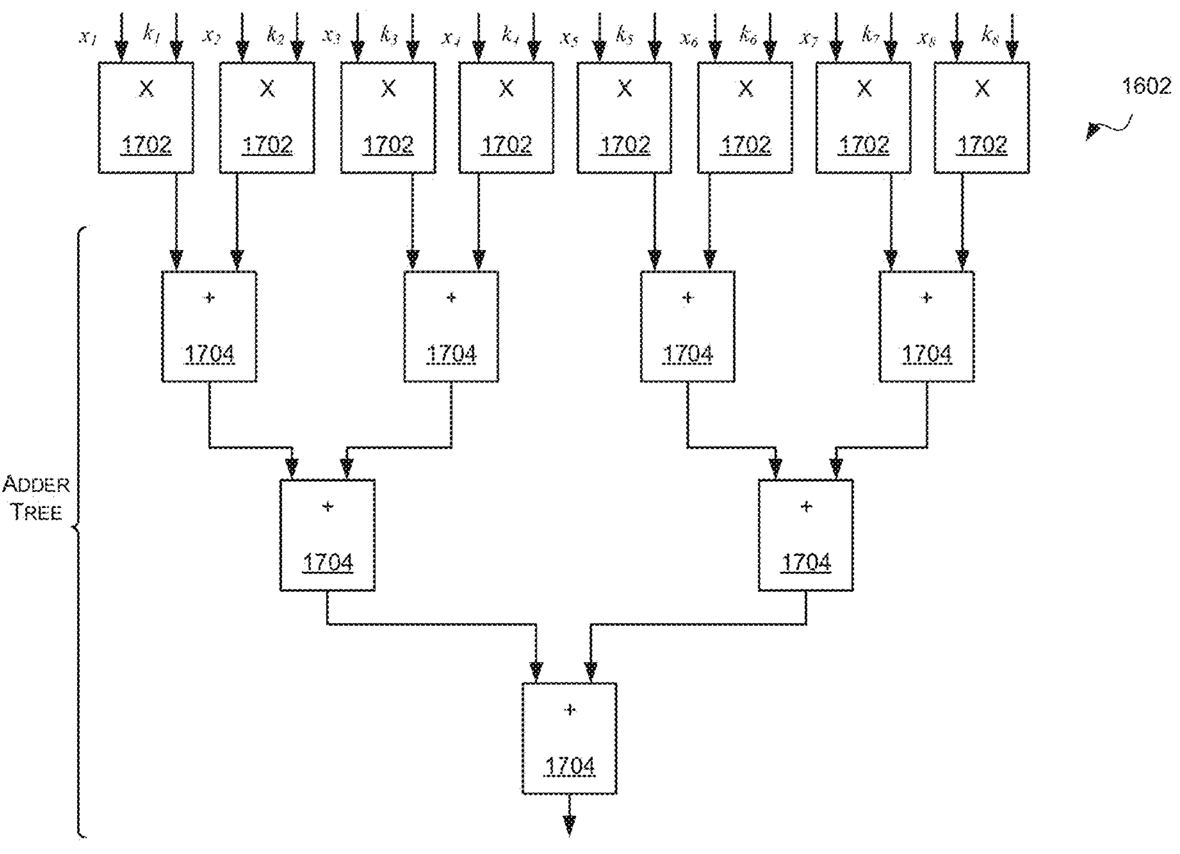
FIG. 17 is a block diagram of an example implementation of the convolution engine of FIG. 16.

Each convolution engine 1602 comprises hardware logic configured to receive a set of weights $\{k_1, k_2 \ldots, k_8\}$ that represent all or a portion of a filter, and a set of input data values $\{x_1, x_2, \ldots, x_8\}$ that represent all or a portion of a window of the input data, and perform a multiply-accumulate calculation on the received weights and input data values. In some examples, as shown in FIG. 17, each convolution engine 1602 may comprise a plurality of multipliers 1702, each of which is configured to multiply a weight ($k_i$) and a corresponding input data value ($x_i$) to produce a multiplication output value. The multipliers 1702 are followed by a plurality of adders 1704. The adders may form an adder tree to calculate the sum of the multiplication outputs. In the example of FIG. 17 the convolution engine 1602 comprises eight multipliers 1702, but in other examples there may be more or fewer multipliers. For example, in some cases there may be 128 multipliers. Generally, if there are Z multipliers, the adder tree comprises Z−1 adders. The example convolution accelerator 1512 of FIG. 16 comprises four convolution engines 1602, however, it will be evident to a person of skill in the art that this is an example only and there may be only one convolution engine, there may be two convolution engines, or there may be more than two convolution engines.

Since it may take more than one hardware pass of the convolution engines 1602 to generate a complete filter result (e.g. because a convolution engine may only receive and process a portion of the weights of a filter and/or a portion of the input data values of a window in a cycle), the convolution accelerator 1512 may comprise a plurality of accumulators 1604. A pass of the convolution engines comprises receiving a set of weights and a set of input data values and performing a multiply-accumulate operation thereon. Each accumulator 1604 receives the output of one convolution engine 1602 and adds the output to previous convolution engine outputs that relate to the same filter. Since a convolution engine 1602 may not generate or produce outputs that relate to the same filter in consecutive cycles the partial results of one or more filters may be stored in an accumulation buffer 1606 and then the appropriate partial results may be provided to the accumulators 1604 each cycle by the accumulation buffer 1606.

In some cases, the convolution accelerator 1512 may comprise or have access to an input buffer 1608 for storing the elements of the input tensor and a coefficient buffer 1610 for storing the weights of the convolution. In some cases the input buffer 1608 may be implemented as a plurality of banks of memory. In these cases, there may be a multiplexor (not shown) for each convolution engine 1602 that is coupled to each bank of the input buffer 1608 to allow the data stored in any of the banks to be selectively directed to any of the convolution engines 1602.

Figure 18:
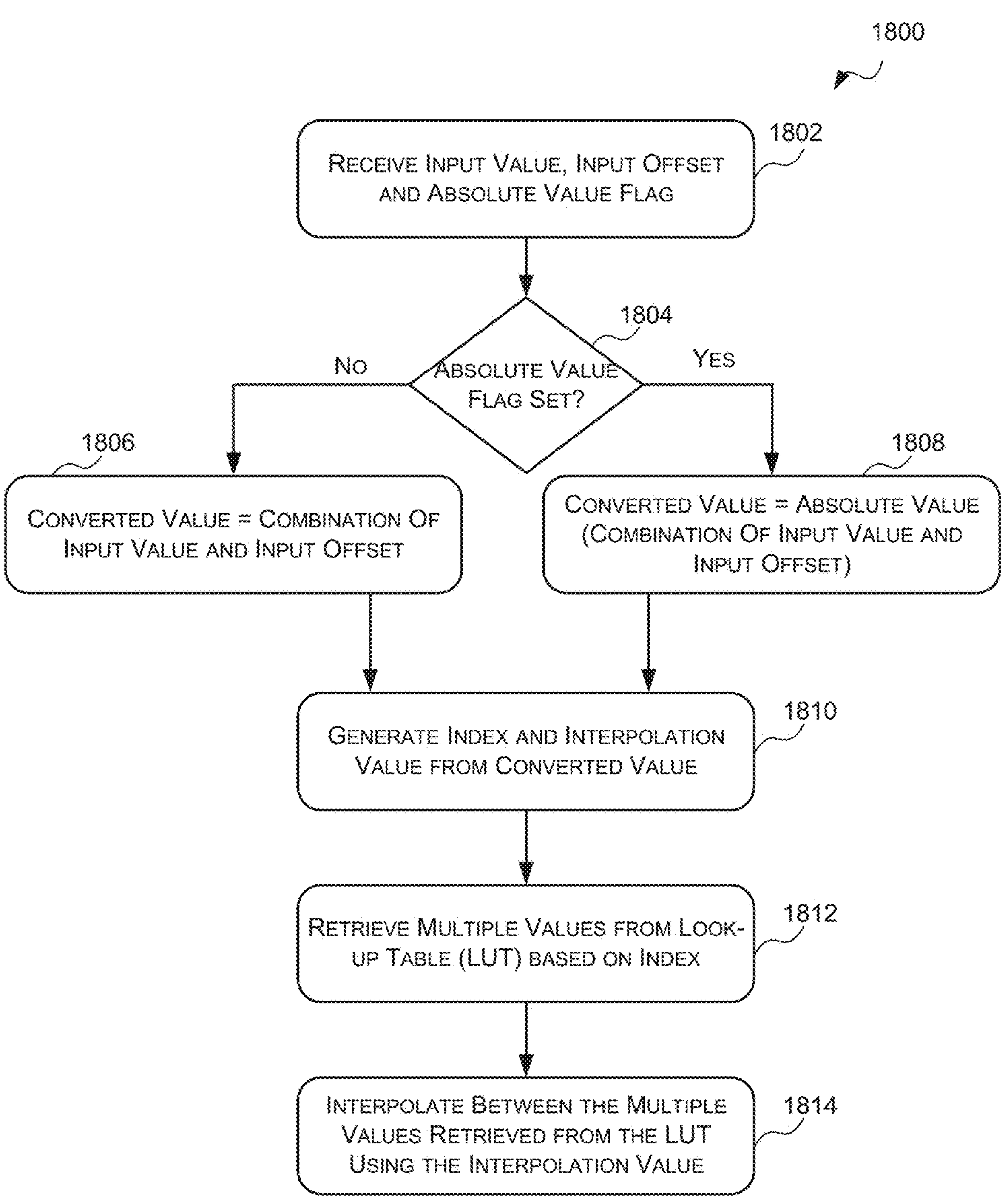
FIG. 18 is a flow diagram of a first example method of applying a non-linear activation function to an input value using an activation accelerator.

Reference is now made to FIG. 18 which illustrates an example method 1800 of applying a non-linear activation function to an input value using an activation accelerator, such as, but not limited to, the activation accelerator 300 of FIG. 3. The method 1800 begins at block 1802 where the activation accelerator receives an input value, an input offset and an absolute value flag. The method 1800 then proceeds to block 1804 where it is determined whether the absolute value flag is set. If the absolute value flag is not set, the method 1800 proceeds to block 1806 where the activation accelerator generates a converted value that is a combination of the input value and the input offset, and then the method 1800 proceeds to block 1810. If the absolute value flag is set, the method 1800 proceeds to block 1808 where the activation accelerator generates a converted value that is the absolute value of the combination of the input value and the input offset, and then the method 1800 proceeds to block 1810. At block 1810 the activation accelerator generates an index and interpolation value from the converted value generated in block 1806 or 1808 then the method 1800 proceeds to block 1812. The index and interpolation value may be generated from the converted value in any suitable manner, such as described above. At block 1812 multiple values are retrieved from a look-up table based on the index and then the method 1800 proceeds to block 1814. The look-up table is configured to store a plurality of values representing the non-linear activation function. At block 1814 the activation accelerator generates an estimated result of the non-linear activation function for the input value from an interpolation output generated by interpolating between the multiple values retrieved from the look-up table using the interpolation value.

Figure 19:
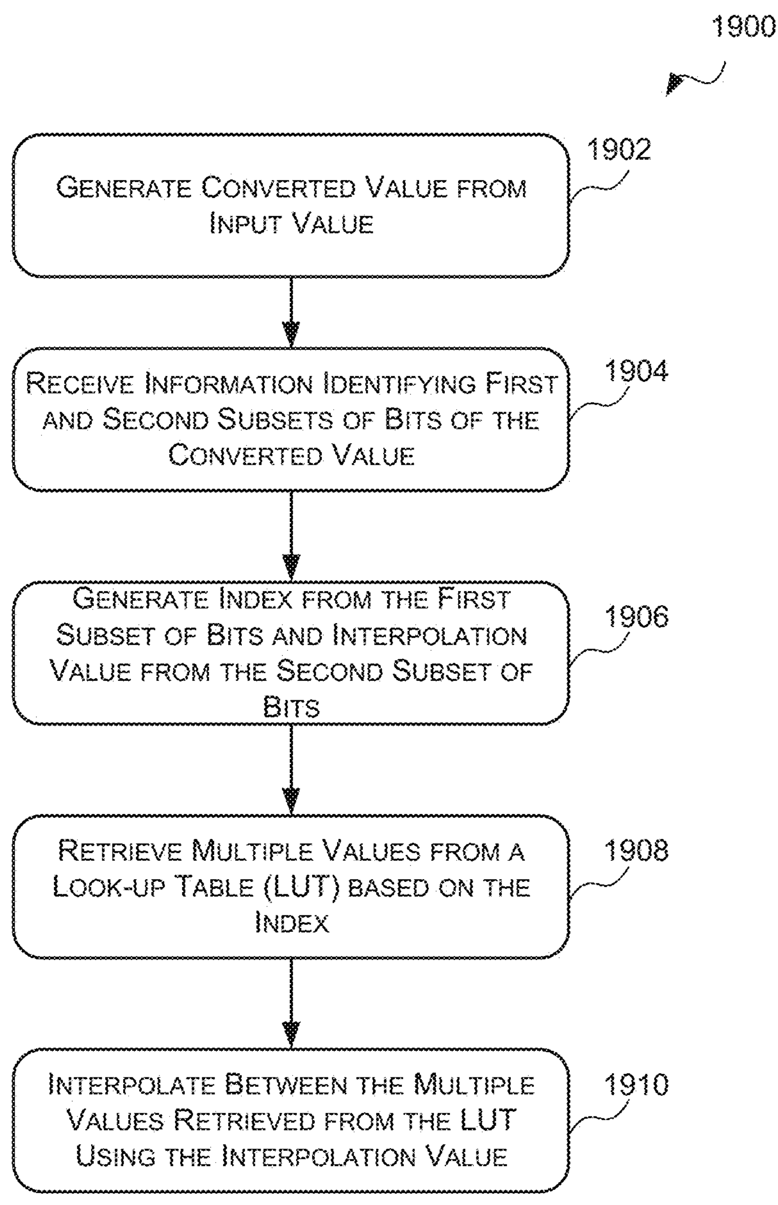
FIG. 19 is a flow diagram of a second example method of applying a non-linear activation function to an input value using an activation accelerator.

Reference is now made to FIG. 19 which illustrates an example method 1900 of applying a non-linear activation function to an input value using an activation accelerator, such as, but not limited to the activation accelerator 800 of FIG. 8. The method 1900 begins at block 1902 where the activation accelerator generates a converted value from an input value. The converted value may be generated in any suitable manner such as described above. The method 1900 then proceeds to block 1904 where the activation accelerator receives information identifying a first subset of bits of the converted value and a second subset of bits of the converted value. At block 1906, the activation accelerator generates an index from the first subset of bits of the converted value and an interpolation value from the second subset of bits of the converted value. At block 1908, the activation accelerator retrieves multiple values from a look-up table based on the index. The look-up table is configured to store a plurality of values representing the non-linear activation function. At block 1910, the activation accelerator generates an estimated result of the non-linear activation function for the input value by interpolating between the multiple values from the look-up table based on the interpolation value.

Figure 20:
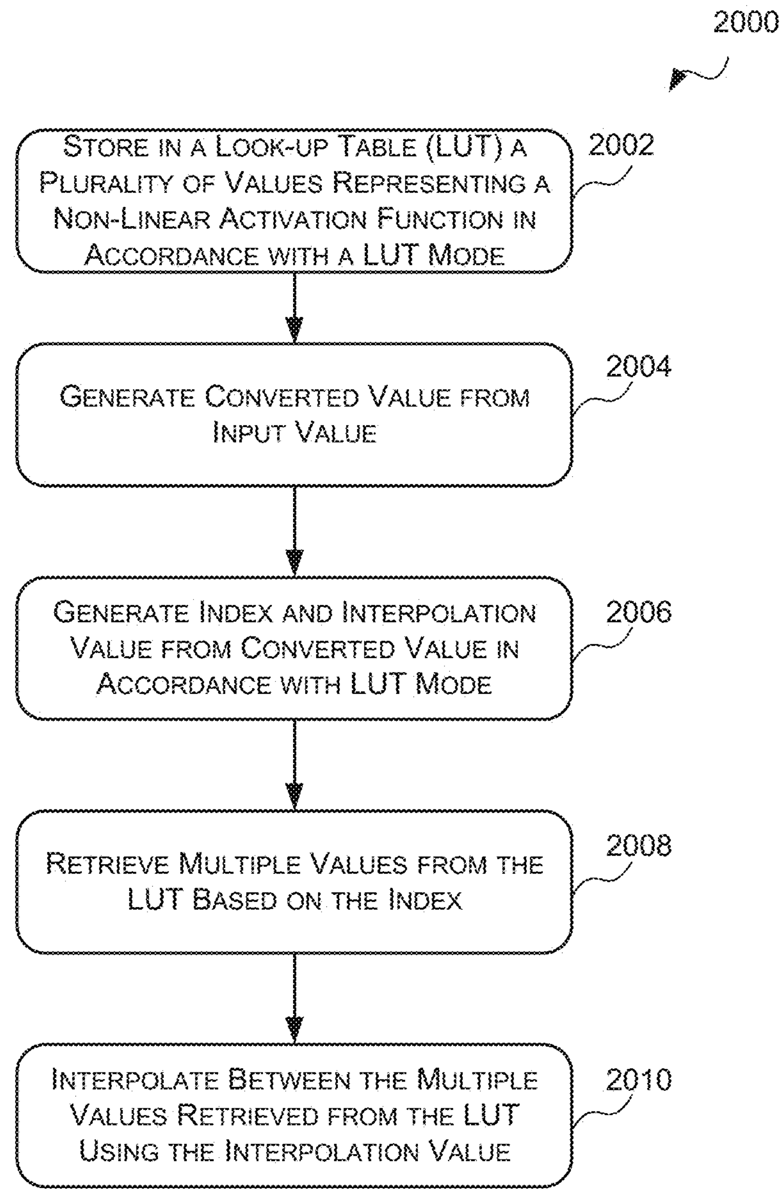
FIG. 20 is a flow diagram of a third example method of applying a non-linear activation function to an input value using an activation accelerator.

Reference is now made to FIG. 20 which illustrates an example method 2000 of applying a non-linear activation function to an input value using an activation accelerator, such as, but not limited to, the activation accelerator 1000 of FIG. 10. The method 2000 begins at block 2002 where a plurality of values representing the non-linear activation function are stored in a look-up table (LUT) in accordance with a LUT mode of a plurality of LUT modes. Examples of the plurality of LUT modes were described above with respect to FIG. 10. At block 2004, the activation accelerator generates a converted value from an input value. Example methods for generating a converted value from an input value were described above. At block 2006, the activation accelerator generates an index to the LUT and an interpolation value from the converted value based on the LUT mode of the plurality of LUT modes. Example methods for generating an index and an interpolation value from the converted value based on the LUT mode were described above with respect to FIG. 10. At block 2008, multiple values are retrieved from the look-up table based on the index. At block 2010, the activation accelerator generates an estimate of the result of the non-linear activation function for the input value by interpolation between the multiple values retrieved from the look-up table based on the interpolation value.

Figure 21:
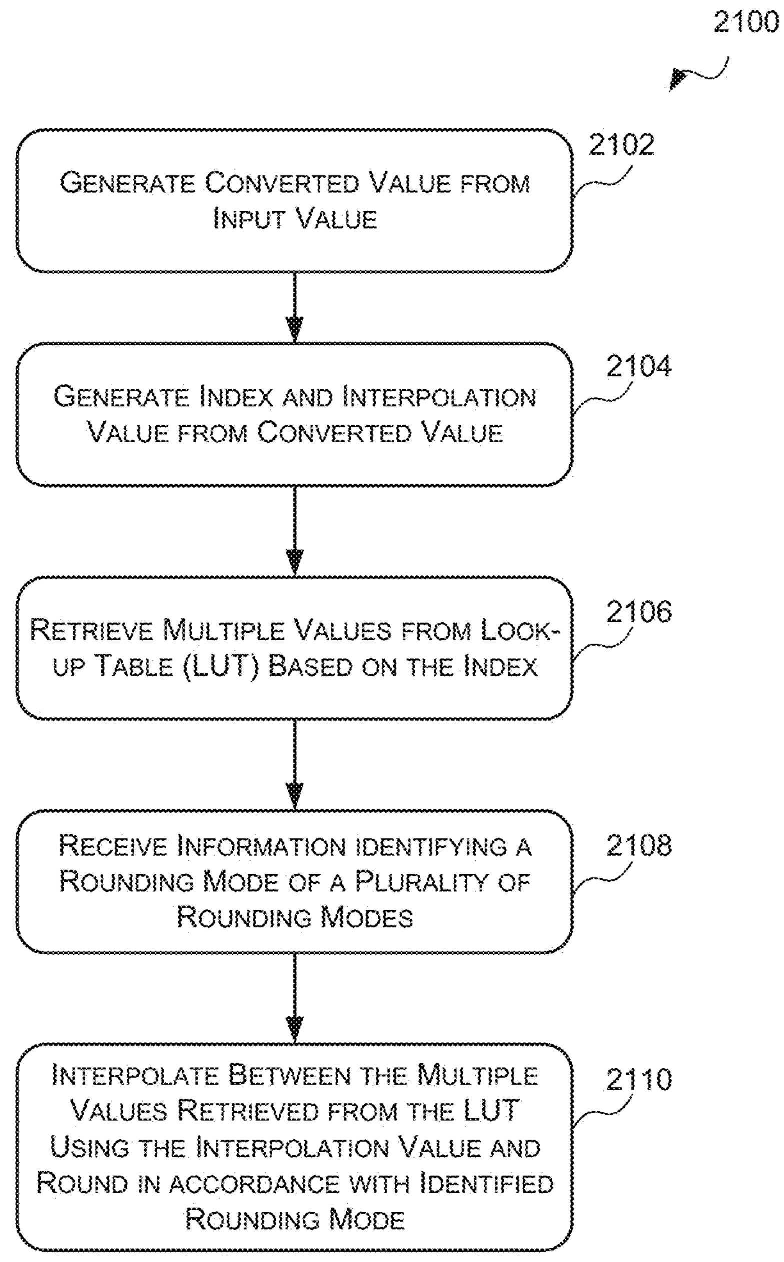
FIG. 21 is a flow diagram of a fourth example method of applying a non-linear activation function to an input value using an activation accelerator.

Reference is now made to FIG. 21 which illustrates an example method 2100 of applying a non-linear activation function to an input value using an activation accelerator, such as, but not limited to, the activation accelerator 1300 of FIG. 13. The method 2100 begins at block 2102 where the activation accelerator generates a converted value from an input value. Example methods of generating a converted value from an input value were described above. At block 2104, the activation accelerator generates an index and an interpolation value from the converted value. Example methods for generating an index and an interpolation value from a converted value were described above. At block 2106, multiple values are retrieved from a look-up table based on the index. The look-up table is configured to store a plurality of values representing the non-linear activation function. At block 2108, the activation accelerator receives information identifying a rounding mode of a plurality of rounding modes. At block 2110, the activation accelerator generates an estimate of the result of the non-linear activation function for the input value from an interpolation output generated by interpolating between the multiple values retrieved from the look-up table using the interpolation values and rounding in accordance with the identified rounding mode. Example methods for generating the interpolation output were described above with respect to FIG. 13.

Figure 22:
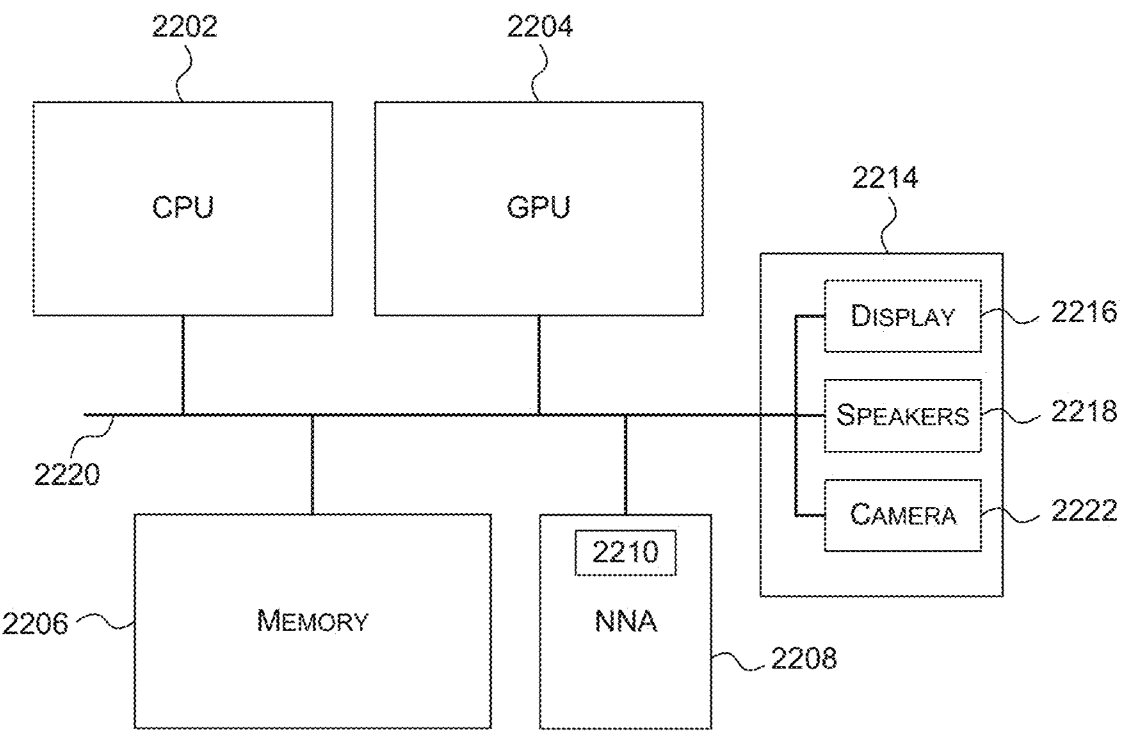
FIG. 22 is a block diagram of an example computer system in which an activation accelerator and/or a neural network accelerator described herein may be implemented.

FIG. 22 shows a computer system in which the activation accelerators and neural network accelerators described herein may be implemented. The computer system comprises a CPU 2202, a GPU 2204, a memory 2206, a neural network accelerator (NNA) 2208 and other devices 2214, such as a display 2216, speakers 2218 and a camera 2222. An activation accelerator 2210 (which may be implemented as any of the activation accelerators described herein) is implemented on the NNA 2208. In other examples, one or more of the depicted components may be omitted from the system, and/or the activation accelerator 2210 may be implemented on the CPU 2202 or within the GPU 2204. The components of the computer system can communicate with each other via a communications bus 2220.

The activation accelerators, neural network accelerators, convolution accelerators and convolution engines of FIGS. 3, 8, 10, and 13-17 are shown as comprising a number of functional blocks. This is schematic only and is not intended to define a strict division between different logic elements of such entities. Each functional block may be provided in any suitable manner. It is to be understood that intermediate values described herein as being formed by a block need not be physically generated by the block at any point and may merely represent logical values which conveniently describe the processing performed by the block between its input and output.

The activation accelerators and neural network accelerators described herein may be embodied in hardware on an integrated circuit. The activation accelerators and neural network accelerators described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be or comprise any kind of general purpose or dedicated processor, such as a CPU, GPU, NNA, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture an activation accelerator or a neural network accelerator configured to perform any of the methods described herein, or to manufacture a computing device comprising any apparatus described herein. An integrated circuit definition dataset may be, for example, an integrated circuit description.

Therefore, there may be provided a method of manufacturing, at an integrated circuit manufacturing system, an activation accelerator or a neural network accelerator as described herein. Furthermore, there may be provided an integrated circuit definition dataset that, when processed in an integrated circuit manufacturing system, causes the method of manufacturing an activation accelerator or a neural network accelerator to be performed.

An integrated circuit definition dataset may be in the form of computer code, for example as a netlist, code for configuring a programmable chip, as a hardware description language defining hardware suitable for manufacture in an integrated circuit at any level, including as register transfer level (RTL) code, as high-level circuit representations such as Verilog or VHDL, and as low-level circuit representations such as OASIS® and GDSII. Higher level representations which logically define hardware suitable for manufacture in an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture an activation accelerator or a neural network accelerator will now be described with respect to FIG. 23.

Figure 23:
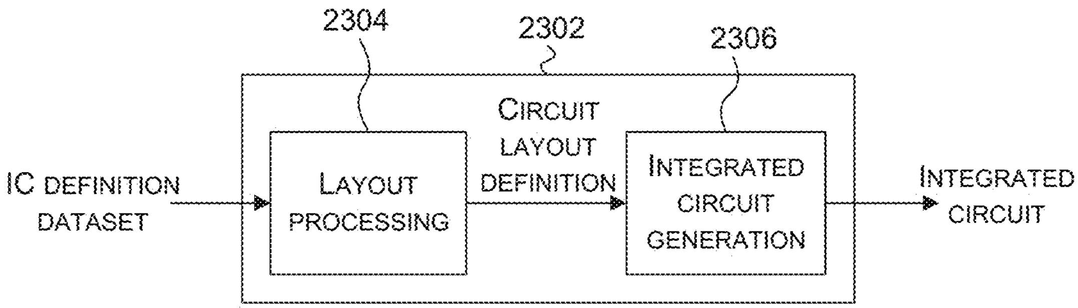
FIG. 23 is a block diagram of an integrated circuit manufacturing system for generating an integrated circuit embodying an activation accelerator or a neural network accelerator described herein.

FIG. 23 shows an example of an integrated circuit (IC) manufacturing system 2302 which is configured to manufacture an activation accelerator, or a neural network accelerator as described in any of the examples herein. In particular, the IC manufacturing system 2302 comprises a layout processing system 2304 and an integrated circuit generation system 2306. The IC manufacturing system 2302 is configured to receive an IC definition dataset (e.g. defining an activation accelerator or a neural network accelerator as described in any of the examples herein), process the IC definition dataset, and generate an IC according to the IC definition dataset (e.g. which embodies an activation accelerator or a neural network accelerator as described in any of the examples herein). The processing of the IC definition dataset configures the IC manufacturing system 2302 to manufacture an integrated circuit embodying an activation accelerator or a neural network accelerator as described in any of the examples herein.

The layout processing system 2304 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 2304 has determined the circuit layout it may output a circuit layout definition to the IC generation system 2306. A circuit layout definition may be, for example, a circuit layout description.

The IC generation system 2306 generates an IC according to the circuit layout definition, as is known in the art. For example, the IC generation system 2306 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 2306 may be in the form of computer-readable code which the IC generation system 2306 can use to form a suitable mask for use in generating an IC.

The different processes performed by the IC manufacturing system 2302 may be implemented all in one location, e.g. by one party. Alternatively, the IC manufacturing system 2302 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture an activation accelerator or a neural network accelerator without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 23 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 23, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. An activation accelerator for use in a neural network accelerator, the activation accelerator comprising:
- a look-up table configured to store a plurality of values representing a non-linear activation function; and
- one or more activation pipelines, each activation pipeline comprising:
  - a range conversion unit configured to receive an input value and generate a converted value from the input value;
  - an index generation unit configured to receive information identifying (i) a first subset of bits of the converted value and (ii) a second subset of bits of the converted value, and in dependence on the received information:
    - generate an index from the first subset of bits of the converted value, and
    - generate an interpolation value from the second subset of bits of the converted value, wherein a number of bits of the index and a number of bits of the interpolation value is determined by the received information;
  - a look-up table interface unit configured to retrieve multiple values from the look-up table based on the index; and
  - an interpolation unit configured to generate an estimated result of the non-linear activation function for the input value by interpolating between the multiple values retrieved from the look-up table based on the interpolation value.

2. The activation accelerator of claim 1, wherein the index generation unit comprises an alignment unit configured to generate an alignment output from the converted value such that the first subset of bits of the converted value is in a first set of bit positions of the alignment output and the second subset of bits of the converted value is in a second set of bit positions of the alignment output.

3. The activation accelerator of claim 2, wherein the information identifying the first subset of bits of the converted value and the second subset of bits of the converted value comprises a shift amount and a shift direction, and the alignment unit is a shift unit configured to generate the alignment output by shifting the converted value in the identified shift direction by the identified shift amount.

4. The activation accelerator of claim 3, wherein the identified shift direction is one of a left shift and a right shift, and when the identified shift direction is a left shift, the identified shift amount is less than or equal to a maximum left shift amount, and, when the identified shift direction is a right shift, the identified shift amount is less than or equal to a maximum right shift amount.

5. The activation accelerator of claim 4, wherein the maximum left shift amount is less than the maximum right shift amount.

6. The activation accelerator of claim 4, wherein the interpolation value comprises B bits and the maximum left shift amount is B bits.

7. The activation accelerator of claim 4, wherein the interpolation value comprises B bits, the index comprises A bits, the converted value comprises Z bits, and the maximum right shift amount is Z−A−B bits.

8. The activation accelerator of claim 2, wherein:
- the index generation unit further comprises a clamp unit which is configured to clamp the alignment output to a clamp range to generate a clamp output; and
- the index and the interpolation value are generated from the clamp output.

9. The activation accelerator of claim 8, wherein the clamp range comprises a minimum value and a maximum value and the clamp unit is configured to clamp the alignment output to the clamp range by setting the clamp output to the minimum value of the clamp range if the alignment output is less than the minimum value of the clamp range, setting the clamp output to the maximum value of the clamp range if the alignment output is greater than the maximum value of the clamp range, and setting the clamp output to a value of the alignment output otherwise,
- wherein the clamp unit is further configured to receive a disable clamp flag, and, when the disable clamp flag is not set, clamp the alignment output to the clamp range to generate the clamp output, and, when the disable clamp flag is set, use all or a portion of the alignment output as the clamp output.

10. The activation accelerator of claim 8, wherein the clamp unit is further configured to receive information identifying a clamp range of a plurality of predetermined clamp ranges, and clamp the alignment output to the identified clamp range,
- wherein, when the look-up table comprises a first number of values representing the non-linear activation function, a first clamp range of the plurality of predetermined clamp ranges is identified, and, when the look-up table comprises a second, different, number of values representing the non-linear activation function, a second clamp range of the plurality of predetermined clamp ranges is identified.

11. The activation accelerator of claim 10, wherein the plurality of predetermined clamp ranges comprises a first clamp range from zero to $2^M-1$, and a second clamp range from zero to $2^N-1$, wherein M and N are different integers.

12. The activation accelerator of claim 11, wherein M−N=1, and the clamp unit is configured to, when the disable clamp flag is set, use all or a portion of the alignment output as the clamp output by, when the identified clamp range is the first clamp range, setting the clamp output to the M least significant bits of the alignment output, and, when the identified range is the second clamp range, setting the most significant bit of the clamp output to zero and setting the N least significant bits of the clamp output to the N least significant bits of the alignment output.

13. The activation accelerator of claim 12, wherein the clamp unit is configured to set the most significant bit of the clamp output to zero and set the N least significant bits of the clamp output to the N least significant bits of the alignment output by combining the alignment output with $2^N-1$ using a bit-wise AND operation.

14. The activation accelerator of claim 1, wherein the index generation unit comprises a split unit configured to receive a version of the converted value and split the received version of the converted value into the index and the interpolation value, wherein the split unit is configured to split the received version of the converted value into the index and the interpolation value by outputting the A most significant bits of the received version of the converted value as the index and outputting the B least significant bits of the version of the converted value as the interpolation value, wherein A and B are integers and the received version of the converted value comprises A+B bits.

15. The activation accelerator of claim 1, wherein the second subset of bits of the converted value comprises none, one or more than one bit of the converted value.

16. The activation accelerator of claim 1, wherein the range conversion unit is configured to receive an input offset and an absolute value flag and generate the converted value from the input value by, when the absolute value flag is not set, combining the input value and the input offset, and, when the absolute value flag is set, generating an absolute value of the combination of the input value and the input offset, wherein the range conversion unit is further configured to generate a negative flag, wherein the negative flag is set if the combination of the input value and the input offset is negative, and the negative flag is not set if the combination of the input value and input offset is not negative; and the interpolation unit is further configured to receive a reverse sign flag and reverse a sign of the estimated result when the reverse sign flag is set and the negative flag is set.

17. The activation accelerator of claim 1, wherein the interpolation unit is further configured to receive information identifying a rounding mode of a plurality of rounding modes and the interpolation unit is configured to generate an interpolation output by interpolating between the plurality of values from the look-up table based on the interpolation result and rounding in accordance with the identified rounding mode, wherein the interpolation unit is further configured to receive information identifying a multiplication value and generating the estimated result further comprises applying the identified multiplication value to the interpolation output.

18. A method of applying a non-linear activation function to an input value using an activation accelerator, the method comprising:

generating, at the activation accelerator, a converted value from an input value;

receiving, at the activation accelerator, information identifying (i) a first subset of bits of the converted value and (ii) a second subset of bits of the converted value, and in dependence on the received information:

generating, at the activation accelerator, an index from the first subset of bits of the converted value and an interpolation value from the second subset of bits of the converted value, wherein a number of bits of the index and a number of bits of the interpolation value is determined by the received information;

retrieving multiple values from a look-up table based on the index, the look-up table configured to store a plurality of values representing the non-linear activation function; and generating, at the activation accelerator, an estimated result of the non-linear activation function for the input value by interpolating between the multiple values from the look-up table based on the interpolation value.

19. An activation accelerator configured to perform the method as set forth in claim 18.

20. A non-transitory computer readable storage medium having stored thereon a computer readable dataset description of an activation accelerator for use in a neural network accelerator that, when processed in an integrated circuit manufacturing system, causes the integrated circuit manufacturing system to manufacture an integrated circuit embodying an activation accelerator comprising:

a look-up table configured to store a plurality of values representing a non-linear activation function; and one or more activation pipelines, each activation pipeline comprising:

a range conversion unit configured to receive an input value and generate a converted value from the input value;

an index generation unit configured to receive information identifying (i) a first subset of bits of the converted value and (ii) a second subset of bits of the converted value, and in dependence on the received information:

generate an index from the first subset of bits of the converted value, and generate an interpolation value from the second subset of bits of the converted value, wherein a number of bits of the index and a number of bits of the interpolation value is determined by the received information;

a look-up table interface unit configured to retrieve multiple values from the look-up table based on the index; and an interpolation unit configured to generate an estimated result of the non-linear activation function for the input value by interpolating between the multiple values retrieved from the look-up table based on the interpolation value.

* * * * *